(12) United States Patent
Walker et al.

(10) Patent No.: US 9,288,376 B2
(45) Date of Patent: Mar. 15, 2016

(54) METHOD AND APPARATUS FOR AUTOMATICALLY CAPTURING AND MANAGING IMAGES

(71) Applicant: Walker Digital, LLC, Stamford, CT (US)

(72) Inventors: Jay S. Walker, Ridgefield, CT (US); James A. Jorasch, New York, NY (US); Russell P. Sammon, San Francisco, CA (US)

(73) Assignee: Inventor Holdings, LLC, Stamford, CT (US)

(*) Notice: Subject to any disclaimer, the term of this patent is extended or adjusted under 35 U.S.C. 154(b) by 0 days.

(21) Appl. No.: 14/610,556

(22) Filed: Jan. 30, 2015

(65) Prior Publication Data

US 2015/0146026 A1    May 28, 2015

Related U.S. Application Data

(63) Continuation of application No. 13/024,428, filed on Feb. 10, 2011, which is a continuation of application No. 11/719,108, filed as application No. PCT/US2004/043460 on Dec. 23, 2004, now Pat. No. 7,924,323.

(60) Provisional application No. 60/532,645, filed on Dec. 24, 2003.

(51) Int. Cl.
| | |
|---|---|
| *H04N 5/232* | (2006.01) |
| *G11B 27/034* | (2006.01) |
| *G11B 27/10* | (2006.01) |
| *G11B 27/28* | (2006.01) |
| *G11B 27/30* | (2006.01) |
| *G11B 27/34* | (2006.01) |
| *H04N 1/00* | (2006.01) |
| *H04N 1/21* | (2006.01) |
| *H04W 4/02* | (2009.01) |
| *H04N 101/00* | (2006.01) |

(52) U.S. Cl.
CPC .......... *H04N 5/23203* (2013.01); *G11B 27/034* (2013.01); *G11B 27/105* (2013.01); *G11B 27/28* (2013.01); *G11B 27/3027* (2013.01); *G11B 27/34* (2013.01); *H04N 1/00204* (2013.01); *H04N 1/2112* (2013.01); *H04N 1/2129* (2013.01); *H04N 1/2137* (2013.01); *H04N 5/23222* (2013.01); *H04W 4/025* (2013.01); *H04N 2101/00* (2013.01); *H04N 2201/214* (2013.01); *H04N 2201/216* (2013.01); *H04N 2201/218* (2013.01)

(58) Field of Classification Search
CPC .............. G11B 27/28; G11B 27/3027; H04N 1/00204; H04N 1/2112; H04N 2201/214; H04N 2201/216
See application file for complete search history.

(56) References Cited

U.S. PATENT DOCUMENTS

| | | | | | |
|---|---|---|---|---|---|
| 5,587,735 | A | * | 12/1996 | Ishida | H04N 5/45 348/14.04 |
| 5,619,030 | A | * | 4/1997 | Shiomi | G03B 5/00 250/201.1 |
| 5,774,750 | A | * | 6/1998 | Honda | G03B 17/48 348/371 |
| 6,278,884 | B1 | * | 8/2001 | Kim | B60R 25/0227 348/14.02 |

(Continued)

*Primary Examiner* — Amy Hsu
(74) *Attorney, Agent, or Firm* — Christopher & Weisberg, P.A.

(57) ABSTRACT

According to one embodiment of the invention, a camera determines whether to acquire an image (e.g., automatically), determines whether to store the acquired image, and determines how to store the acquired image.

20 Claims, 16 Drawing Sheets

(56) References Cited

U.S. PATENT DOCUMENTS

| | | | | |
|---|---|---|---|---|
| 7,057,645 B1* | 6/2006 | Hara | G03B 5/00 | 348/208.2 |
| 7,098,946 B1* | 8/2006 | Koseki | H04N 5/23293 | 348/229.1 |
| 7,146,179 B2* | 12/2006 | Parulski | H04N 1/00132 | 348/211.2 |
| 7,440,634 B2* | 10/2008 | Ben-Ezra | G06T 7/2006 | 382/255 |
| 7,472,134 B2* | 12/2008 | Kaku | G06F 17/30259 | |
| 7,512,416 B2* | 3/2009 | Arell | H04M 1/05 | 348/374 |
| 2001/0021224 A1* | 9/2001 | Larkin | G06T 7/206 | 375/240.16 |
| 2002/0110361 A1* | 8/2002 | Moriyama | G06T 1/005 | 386/260 |
| 2002/0163581 A1* | 11/2002 | Kitazawa | H04N 5/23248 | 348/208.6 |
| 2003/0012425 A1* | 1/2003 | Suzuki | G02B 27/0093 | 382/154 |
| 2003/0117511 A1* | 6/2003 | Belz | H04N 1/0044 | 348/333.11 |
| 2003/0193603 A1* | 10/2003 | Parulski | H04N 1/00135 | 348/333.12 |
| 2003/0222981 A1* | 12/2003 | Kisak | B61L 15/0027 | 348/148 |
| 2004/0070671 A1* | 4/2004 | Bengtsson | H04N 1/00209 | 348/207.1 |
| 2004/0109063 A1* | 6/2004 | Kusaka | H04N 1/00244 | 348/207.1 |
| 2004/0174443 A1* | 9/2004 | Simske | G06F 17/30241 | 348/231.3 |
| 2004/0203386 A1* | 10/2004 | Tischler | G08B 13/19658 | 455/41.2 |
| 2005/0001743 A1* | 1/2005 | Haemerle | G08G 1/0962 | 340/988 |
| 2005/0057653 A1* | 3/2005 | Maruya | G08B 13/19608 | 348/159 |
| 2005/0134691 A1* | 6/2005 | Cox | H04N 1/00307 | 348/207.99 |

* cited by examiner

| ACQUIRE CONDITION IDENTIFIER 705 | ACQUIRE CONDITION 710 |
|---|---|
| AC-47532524-01 | (CAMERA_VIEWFINDER.IN_USE = "TRUE") |
| AC-47532524-02 | NOT (CAMERA_MOVING) AND (-5 DEGREES < CAMERA_ROLL < 5 DEGREES) |
| AC-47532524-03 | (SHUTTER_BUTTON = "HALFWAY_PRESSED") |
| AC-47532524-04 | (AVERAGE_AUDIO_NOISE_LEVEL >= 70 DB) |
| AC-47532524-05 | (TIME_SINCE_LAST_IMAGE_CAPTURED < 5 SECONDS) AND NOT (CAMERA_MOVING) |

| IMAGE IDENTIFIER 805 | TIME 810 | REASON 815 | OVERALL RATING 820 | IMAGE STORED 825 | COMPRESSION SETTING 830 |
|---|---|---|---|---|---|
| WEDDING-01 | 1:40PM 8/3/02 | AC-47532524-01 | 7.7 | YES | 95% |
| WEDDING-02 | 1:41PM 8/3/02 | USER PRESSED SHUTTER BUTTON | 6.9 | YES | 95% |
| WEDDING-03 | 1:55PM 8/3/02 | AC-47532524-05 | 3.4 | NO | N/A |
| WEDDING-04 | 8:56PM 8/18/02 | AC-47532524-02 | 5.6 | YES | 85% |
| BEACHTRIP-05 | 11:50AM 8/10/02 | AC-47532524-03 | 4.7 | YES | 80% |
| BEACHTRIP-06 | 11:51AM 8/10/02 | USER PRESSED SHUTTER BUTTON | 6.3 | YES | 95% |
| BEACHTRIP-07 | 12:24PM 8/10/02 | AC-47532524-01 | 7.1 | YES | 95% |
| YOSEMITE-08 | 9:02AM 8/18/02 | SELF-TIMER | 6.4 | YES | 95% |
| YOSEMITE-09 | 9:02AM 8/18/02 | AC-47532524-05 | 3.9 | NO | N/A |
| YOSEMITE-10 | 7:22PM 8/18/02 | AC-47532524-01 | 6.8 | YES | 90% |

FIG. 8

| IMAGE IDENTIFIER 905 | EXPOSURE RATING 910 | SHARPNESS RATING 915 | COMPOSITION RATING 920 | SUBJECT RATING 925 | OVERALL RATING 930 |
|---|---|---|---|---|---|
| WEDDING-01 | 8.5 | 7.2 | 7.1 | 8.0 | 7.7 |
| WEDDING-02 | 6.0 | 7.5 | 7.2 | N/A | 6.9 |
| WEDDING-03 | 2.1 | 5.1 | 1.4 | 5.0 | 3.4 |
| WEDDING-04 | 5.2 | 6.0 | 5.5 | 5.7 | 5.6 |
| BEACHTRIP-05 | 4.5 | 7.0 | 3.2 | 4.1 | 4.7 |
| BEACHTRIP-06 | 4.1 | 7.4 | 7.5 | N/A | 6.3 |
| BEACHTRIP-07 | 6.3 | 7.9 | 6.9 | 7.1 | 7.1 |
| YOSEMITE-08 | 7.2 | 4.5 | 7.4 | N/A | 6.4 |
| YOSEMITE-09 | 4.0 | 5.5 | 3.9 | 2.3 | 3.9 |
| YOSEMITE-10 | 7.7 | 7.3 | 6.3 | 5.9 | 6.8 |

| IMAGE IDENTIFIER 1005 | IMAGE FORMAT 1010 | FILE SIZE 1015 | METHOD 1020 | OVERALL RATING 1025 | META-DATA 1030 |
|---|---|---|---|---|---|
| WEDDING-01 | JPEG | 1494 KB | AUTOMATIC | 7.7 | SUBJECTS: ALICE, BOB |
| WEDDING-02 | JPEG | 1512 KB | MANUAL | 6.9 | SUBJECTS: ALICE, BOB; ROTATE 90 DEGREES CLOCKWISE TO DISPLAY |
| WEDDING-04 | TIFF | 968 KB | AUTOMATIC | 5.6 | <ASSOCIATED SOUND RECORDING> FLOURESCENT LIGHTING |
| BEACHTRIP-05 | TIFF | 904 KB | AUTOMATIC | 4.7 | LOCATION: BEACH; EXPOSURE SETTINGS: F/5.6, 1/250 SEC, 100 ASA |
| BEACHTRIP-06 | RAW | 1494 KB | MANUAL | 6.3 | LOCATION: BEACH; EXPOSURE SETTINGS: F/5.6, 1/250 SEC, 100 ASA |
| BEACHTRIP-07 | JPEG | 1234 KB | AUTOMATIC | 7.1 | NONE |
| YOSEMITE-08 | JPEG | 1351 KB | MANUAL | 6.4 | LOCATION: N 37° 44' 53.0" - W 119° 33' 36.9" |
| YOSEMITE-10 | JPEG | 1023 KB | AUTOMATIC | 6.8 | SCENE: SUNSET |

FIG. 10

| COMPRESSION CONDITION 1105 | SELECTION CONDITION 1110 | AMOUNT TO COMPRESS 1115 |
|---|---|---|
| (AMOUNT_OF_FREE_MEMORY < 10 MB) | (IMAGE_CAPTURED_AUTOMATICALLY) AND (IMAGE_RATING <= 7.0) | IF (6.0 < IMAGE_RATING < 7.0) THEN COMPRESSION_SETTING = 70% IF (IMAGE_RATING <= 6.0) THEN COMPRESSION_SETTING = 60% |
| (AMOUNT_OF_FREE_MEMORY < 20 MB) AND (%_OF_AUTO_CAPTURED_IMAGES >= 50%) | (IMAGE_CAPTURED_AUTOMATICALLY) AND (IMAGE_RATING < 5.0) | COMPRESSION_SETTING = 10 + 9 * IMAGE_RATING |
| (%_OF_MEMORY_USED > 85%) | (IMAGE_CAPTURED_AUTOMATICALLY) | NEW_IMAGE_FILE_SIZE = (0.8 * OLD_IMAGE_FILE_SIZE) |
| (%_OF_MEMORY_USED > 95%) | (IMAGE_RATING < 4.0) | DELETE IMAGE(S) |
| (NUMBER_OF_AUTO_CAPTURED_IMAGES > 100) | (IMAGE_SIZE > 1MB) AND (IMAGE_COMPRESSIBILITY > 20%) | MAX_IMAGE_FILE_SIZE = 900 KB MIN_IMAGE_FILE_SIZE = 700 KB |
| (SPACE_OCCUPIED (IMAGES_OF_ALICE) > 50 MB) | (IMAGE_CAPTURED_AUTOMATICALLY) AND (IMAGE_SUBJECT = "ALICE") | IF (SINGLE_SUBJECT) THEN COMPRESSION_SETTING = 50% IF (MULTIPLE_SUBJECTS) THEN COMPRESSION_SETTING = 70% |

| IMAGE IDENTIFIER 1205 | ORIGINAL FILE SIZE 1210 | SELECTED FOR COMPRESSION 1215 | CURRENT FILE SIZE 1220 |
|---|---|---|---|
| WEDDING-01 | 1494 KB | NO | 1494 KB |
| WEDDING-02 | 1512 KB | NO | 1512 KB |
| WEDDING-04 | 968 KB | YES | 586 KB |
| BEACHTRIP-05 | 904 KB | YES | 548 KB |
| BEACHTRIP-06 | 1494 KB | NO | 1494 KB |
| BEACHTRIP-07 | 951 KB | NO | 951 KB |
| YOSEMITE-08 | 856 KB | YES | 715 KB |
| YOSEMITE-10 | 904 KB | YES | 758 KB |

FIG. 12

METHOD AND APPARATUS FOR AUTOMATICALLY CAPTURING AND MANAGING IMAGES

CROSS-REFERENCE TO RELATED APPLICATION

This application is a continuation of U.S. patent application Ser. No. 13/024,428, filed Feb. 10, 2011, entitled "METHOD AND APPARATUS FOR AUTOMATICALLY CAPTURING AND MANAGING IMAGES", which claims priority to U.S. patent application Ser. No. 11/719,108, filed May 11, 2007, entitled "METHOD AND APPARATUS FOR AUTOMATICALLY CAPTURING AND MANAGING IMAGES", which issued as U.S. Pat. No. 7,924,323, on Apr. 12, 2011, which itself claims the benefit of International Patent Application No. PCT/US2004/043460, filed Dec. 23, 2004, entitled, "METHOD AND APPARATUS FOR AUTOMATICALLY CAPTURING AND MANAGING IMAGES"; which claims priority to U.S. Provisional Application No. 60/532,645, filed Dec. 24, 2003 entitled, "METHOD AND APPARATUS FOR AUTOMATICALLY CAPTURING AND MANAGING IMAGES", the content of each of the above applications is incorporated herein by reference.

BRIEF DESCRIPTION OF THE FIGURES

FIG. 7 is a table illustrating an exemplary data structure of an acquire condition database consistent with at least one embodiment of the present invention.

FIG. 8 is a table illustrating an exemplary data structure of an acquired image log consistent with at least one embodiment of the present invention.

FIG. 9 is a table illustrating an exemplary data structure of an image rating database consistent with at least one embodiment of the present invention.

FIG. 10 is a table illustrating an exemplary data structure of a captured image database consistent with at least one embodiment of the present invention.

FIG. 11 is a table illustrating an exemplary data structure of a compression condition database consistent with at least one embodiment of the present invention.

FIG. 12 is a table illustrating an exemplary data structure of a compression tracking database consistent with at least one embodiment of the present invention.

DETAILED DESCRIPTION

Figure 1:
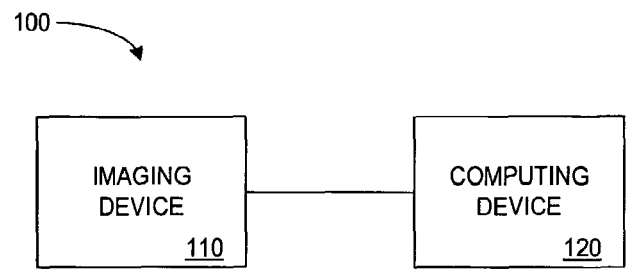
FIG. 1 shows a block diagram of a system that is consistent with at least one embodiment of the present invention.

Applicants have recognized that, in accordance with some embodiments of the present invention, some types of users of cameras (and other types of imaging devices) may find it appealing to have a camera that is able to capture one or more images automatically.

Applicants have further recognized that, in accordance with some embodiments of the present invention, some types of users may find it appealing to have an imaging device that automatically manages stored images (e.g., automatically-captured images) and/or automatically manages memory associated with an imaging device. Some types of users may find it appealing, for example, to have a camera that automatically frees up memory of the camera (e.g., for capturing images).

Applicants have further recognized that, in accordance with one or more embodiments of the present invention, some types of users may find it appealing to be provided methods and apparatus for automatically capturing and managing images such that users may be able to capture higher quality images easily and reliably while minimizing or otherwise managing the danger of running out of memory on their cameras.

According to one embodiment of the present invention, a method and apparatus are provided for capturing images automatically (e.g., without any direct indication from a user). In one example, whenever a user raises or aims an imaging device (e.g., a camera) to take a picture, the imaging device may automatically capture a plurality of images (e.g., with different respective exposure settings, focus settings, etc). Such images may be captured, for example, as an auto-bracketed set when a user presses the shutter button of a camera, or they may be captured completely independently of images that are captured by the user pressing the shutter button. Automatically capturing different images of a scene (that may or may not be changing) may provide the benefit that the user ends up with at least one high quality image for any scene.

According to one embodiment of the present invention, a camera or other type of imaging device includes or otherwise has access to an image analysis program that rates images (e.g., based on their exposure quality, desirability to a user, or other factors). For example, a camera consistent with some embodiments of the present invention may use a color histogram to determine whether an image is overexposed, is underexposed, is in focus, or has too much contrast. A rating that is indicative of the image's quality may be assigned to the image, for example, based on the results of the image analysis. For instance, high quality images may receive higher ratings (e.g., 8 or 9 out of 10), while lower quality images may receive lower ratings (e.g., 2 or 3 out of 10).

According to various embodiments of the present invention, an imaging device (e.g., a digital camera) is provided that is operable to perform a variety of different processes based on a quality of one or more images, and additionally may be able to determine (e.g., in accordance with a stored program, or based one or more stored rules) which of a plurality of available actions to perform. Such a determination may be based on a variety of factors, such as, without limitation, an amount of free memory, a quality of an image, and/or a rate at which new images are being captured.

According to one or more embodiments of the present invention, a method and apparatus are provided operable to automatically capture a plurality of images (e.g., via a digital camera or other imaging device) and is further operable to determine whether to stop automatically capturing images. According to one embodiment, a camera is operable to automatically capture a plurality of images of a scene (e.g., a family building a sandcastle on a beach). After a number of images have been taken (e.g., halfway through a predetermined set), the camera may evaluate the images already captured by rating them. If one or more of the images already captured are determined to be of sufficient quality (e.g., by meeting a predetermined rating or other measure of quality), then the camera may determine that it should stop capturing images. Otherwise (e.g., if the camera determines that the captured images are of insufficient quality), the camera may proceed to capture one or more additional images of the scene. In this way, the camera may ensure that at least one image of desirable quality is captured.

According to at least one embodiment of the present invention, a method and apparatus are provided by which an imaging device (e.g., a digital camera) may manage memory and/or stored images (e.g., automatically-captured images) automatically. It will be readily understood that although a memory available to an imaging device for storing images may have a large capacity, the capacity may be limited.

According to one embodiment of the present invention, a method and apparatus are provided for automatically compressing or deleting one or more images, including images acquired automatically (e.g., by a digital camera).

According to one embodiment of the present invention, a method and apparatus are provided for acquiring an image, determining a quality of the image, and determining a resolution at which to store the image based on the quality.

According to another embodiment of the present invention, a method and apparatus are provided for acquiring an image automatically, storing the image in a memory (e.g., an image buffer), and evaluating the quality of the image. Evaluating may comprise determining if an image is of a predetermined quality (e.g., "high" quality, or the image has an associated rating greater than a threshold value). In some embodiments, an image of a first predetermined quality may be stored (e.g., in a flash memory card) in a first resolution and an image of a second determined quality may be stored in a second resolution, compressed, or deleted.

According to one embodiment of the present invention, a method and apparatus are provided for determining if an amount of memory available for storing images is less than a predetermined threshold and determining whether one or more images should be compressed and/or one or more images should be deleted. In one example, if a camera begins to run low on memory (e.g., 90% of the camera's secondary memory is occupied), then the camera may determine that one or more automatically captured images should be compressed or deleted to free up some memory space.

According to one embodiment of the present invention, a method and apparatus are provided for determining which of a plurality of stored images to compress, and, optionally, determining how much to compress a particular image or images. For example, a camera may determine to compress the ten stored images of the lowest quality (e.g., lowest quality ratings) and may also determine how much to compress these images (e.g., lower quality images may be compressed more or deleted).

According to one embodiment of the present invention, a method and apparatus is provided for capturing images automatically and automatically managing images (e.g., automatically-captured images) stored on an imaging device (e.g., a digital camera).

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The term "plurality" means "two or more," unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing instructions that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including wires that comprise a system bus coupled to a processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable-media may be involved in carrying a sequence of instructions to a processor.

Various embodiments of the present invention are described herein with reference to the accompanying drawings. The leftmost digit(s) of a reference numeral typically identifies the figure in which the reference numeral first appears.

Embodiments of the present invention will first be introduced by means of block diagrams of exemplary systems and devices that may be utilized by an entity practicing one or more embodiments of the present invention. Exemplary data structures illustrating tables that may be used when practicing various embodiments of the present invention will then be described, along with corresponding flowcharts that illustrate exemplary processes with reference to the exemplary devices, systems, and tables.

As will be understood by those skilled in the art, the drawings and accompanying descriptions presented herein indicate some exemplary arrangements for stored representations of information. A number of other arrangements may be employed besides the tables shown. Similarly, the illustrated entries represent exemplary information, but those skilled in the art will understand that the number and content of the entries can be different from those illustrated herein.

1. Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

an imaging device—a device, such as a camera, that is used to capture an image. In one example, an imaging device is a digital camera that captures images and stores them digitally.

user—one or more people who operate an imaging device.

image—a two-dimensional representation of light reflected or emitted by a scene. For example, an image may comprise, without limitation, a photo, photograph, picture, and/or shot.

capturing an image—the process of recording an image. In one example, a camera may capture an image when a user presses the camera's shutter button. Capturing an image may comprise, for example, taking a picture, photographing, and/or taking a photograph. In another example, capturing an image may comprise one or more of: acquiring an image and storing an image.

acquiring an image—In one example, using an image sensor (e.g., of a camera) to determine an image. An acquired image may be stored temporarily in memory (e.g., in an image buffer or RAM) for further processing (e.g., determining one or more ratings, determining whether to store the image).

storing an image—In one example, storing a representation of an image in removable or non-volatile memory.

compressing an image—reducing an amount of memory used to store an image. Compressing an image may include, for example, reducing a size of a file (or other type of memory allocation) used to store an image, or deleting a file that stores an image.

compression setting—a parameter that affects how much an image an image is compressed. In one example, a compression program (e.g., a JPEG image compression program) compresses an image based on a compression setting. For instance, a compression setting of "60%" may compress an image more than a compression setting of "80%."

capturing an image manually—In one example, a user capturing an image by operating a control of an imaging device. In one example, a user may press the shutter button on a camera to capture an image or otherwise indicate or provide a signal that the camera should capture the image.

capturing an image automatically—In one example, capturing an image absent or without receiving a request for the image from a user. In another example, a camera may capture an image automatically without a user pressing a shutter button on the camera. In another example, a camera may capture an image automatically without a user initiating a timer.

acquire condition—a condition that, if satisfied, may cause at least one image to be acquired by an imaging device. An acquire condition may be associated with one or more criteria, events, circumstances, and/or triggers.

compression condition—a condition that, if satisfied, may cause at least one image to be compressed or deleted by an imaging device. A compression condition may be associated with one or more criteria, events, circumstances, and/or triggers.

selection condition—a condition that may be used to select one or more images to be compressed or deleted by the camera. A selection condition may be associated with one or more criteria, events, circumstances, and/or triggers.

rating—information that indicates a quality of an image. In one example, a rating may include a measurement of the quality of an image. In another example, a well-exposed, interesting image may be associated with a higher rating than an under-exposed, boring image.

meta-data or meta-tag—supplementary information associated with an image. Some examples of meta-data that may be associated with an image include: a time, a date, a location, one or more subjects of an image, one or more settings of an imaging device (e.g., when the image was captured), and an audio clip.

meta-tagging—associating meta-data or other supplementary information with an image.

auto-bracketed, auto-bracketing—relating to the capturing or acquiring of a plurality of images of a scene, with at least one setting on the camera being adjusted among the plurality of images. For example, the camera might auto-bracket for exposure by capturing four images of a scene, each image being captured with a different aperture setting (e.g., f/2.8, f/3.5, f/5, and f/8). As will be readily understood, an imaging device may auto-bracket for one or more other types of settings including without limitation, shutter speed, ISO, focus, zoom, white balance, color saturation, flash brightness, or any other setting that may affect an image captured by the camera.

primary memory—primary memory will typically refer herein to volatile memory or memory that is used by the camera's processor in performing calculations. RAM and memory buffers are examples of primary memory.

secondary memory—secondary memory will typically refer herein to memory that is non-volatile, that may be used for storing information over a longer period of time than primary memory, and/or memory that is removable from a camera or other imaging device. A flash memory card is one example of secondary memory.

2. Systems and Devices

Referring now to FIG. 1, a block diagram of a system 100 according to at least one embodiment of the present invention includes an imaging device 110 in communication (e.g., via a communications network or system bus) with a computing device 120. Various exemplary means by which devices may communicate are discussed below with respect to FIG. 3. Although only one imaging device 110 and one computing device 120 are depicted in FIG. 1, it will be understood that any number and type of imaging devices 110 may communicate with any number of computing devices 120.

Various types of imaging devices 110 and computing devices 120 are discussed herein. The imaging device 110 preferably comprises at least one device or component for acquiring and/or recording an image, such as, without limitation, an image sensor, a camera, or a handheld device having an integrated camera. It will be understood, therefore, that a lens and an image sensor, for example, may each be referred to individually as an imaging device, or, alternatively, two or more such components may be referred to collectively as an imaging device (e.g., as embodied in a camera or PDA). Further, it will be understood, as discussed further below with respect to FIG. 2, that a device embodying any such components (e.g., a camera) may itself be referred to as an imaging device.

The imaging device 110 may further comprise one or more types of computing devices, such as those based on the Intel Pentium® processor, adapted to communicate with the computing device 120. For example, as will be readily apparent to those skilled in the art, many types of cameras include an imaging device (e.g., an image sensor for capturing images) and a computing device (e.g., a processor for executing camera functions).

Figure 2:
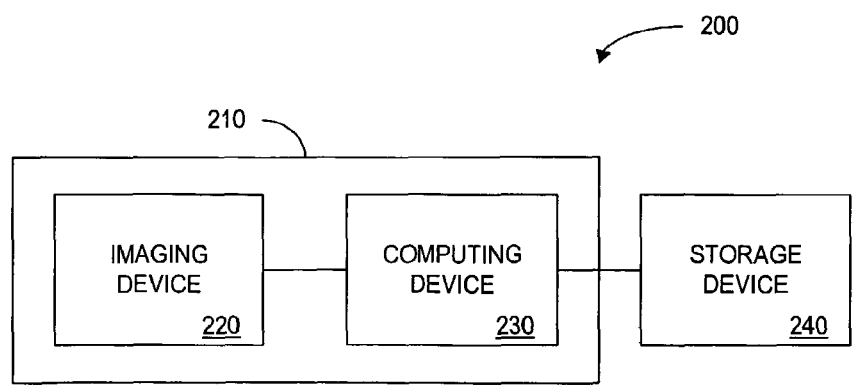
FIG. 2 shows a block diagram of a system that is consistent with at least one embodiment of the present invention.

For example, referring now to FIG. 2, a block diagram of a system 200 according to at least one embodiment of the present invention includes a camera 210 in communication (e.g., via a communications network) with a storage device 240 (e.g., a server, an external hard drive). The camera 210 comprises an imaging device 220 (e.g., an image sensor and/or or lens) and a computing device 230 (e.g., a camera processor) that is in communication (e.g., via a communication port of the computing device 230) with the storage device 240 (e.g., a Web server). In some embodiments, the computing device 230 may include or may be in communication with a storage device or memory other than storage device 240. For example, the camera 210 may comprise a flash memory card, and/or the computing device 230 may comprise RAM or ROM. It will be understood that a device such as the camera 210, comprising both an imaging device and a computing device, may itself be referred to, alternatively, as an imaging device or a computing device.

Referring again to FIG. 1, a computer or computing device 120 may comprise one or more processors adapted to communicate with the imaging device 110 (or one or more computing devices of the imaging device 110). As discussed herein, a computer or computing device 120 preferably also comprises a memory (e.g., for storing a program executable by the processor, for storing images) and may optionally comprise a communication port (e.g., for communication with an imaging device 110 and/or other devices). Some examples of a computer or computing device 120 include, without limitation: a camera processor, a camera, a server, a PDA, a personal computer, a computer server, personal computer, portable hard drive, digital picture frame, or other electronic device. Thus, a computing device 120 may but need not include any devices for capturing images. Some exemplary components of a computing device are discussed in further detail below.

In some exemplary embodiments of the present invention, as discussed herein, imaging device 110 comprises a camera (e.g., a camera 330 of FIG. 3) and the computing device 120 comprises a server or other device configured to store information. In another example consistent with at least one embodiment of the present invention, the system 100 depicts components of a camera or other device capable of recording images. For instance, the imaging device 110 may comprise an image sensor or lens in communication via a camera system bus with a computing device 120 such as a camera computer or integrated communication device (e.g., a mobile phone).

An imaging device 110 or camera 210 may communicate with one or more other devices (e.g., computing device 120, storage device 240) in accordance with one or more systems and methods of the invention. Examples of devices that an imaging device may communicate with include, without limitation:

(i) a personal digital assistant (PDA)
(ii) a cellular telephone
(iii) a digital wallet (e.g., the iPod™ by Apple, the MindStor™ from Minds@Work, Nixvue's Digital Album™)
(iv) a portable stereo (e.g., an MP3 (or other file format) music player, a Sony Discman™)
(v) a notebook computer
(vi) a tablet computer
(vii) a digital picture frame (e.g., Iomega's FotoShow™, NORDview's Portable Digital Photo Album™)
(viii) a GPS device (e.g., such as those manufactured by Garmin)
(ix) a personal computer According to various embodiments of the present invention, an imaging device 110 may transfer one or more images to a second device (e.g., computing device 120). Some examples are provided with reference to FIGS. 1-3. In one example, a camera 210 may include a wireless communication port that allows the camera to transmit images to a second electronic device (e.g., storage device 240). The second electronic device may then store copies of the images. After transferring the images to this second electronic device, the imaging device 110 may optionally delete or compress the images because they are now stored on the second electronic device.

According to another exemplary embodiment, the camera 210 may include or be connected to a cellular telephone with wireless communication capabilities (e.g., a cellular telephone on a 2.5G or 3G wireless network). Using the cellular telephone, the camera 210 may transmit one or more images to a server, which may store the images.

In another example, an imaging device 110 may communicate with a portable hard drive such as an Apple iPod™. To free up memory on the imaging device 110, the imaging device 110 may transfer images to the portable hard drive.

In another example, the imaging device 110 may have a wireless Internet connection (e.g., using the 802.11 wireless protocol) and use this connection to transmit images to a personal computer that is connected to the Internet. Note that by transferring an image from a camera to a second electronic device, the camera may effectively expand its available memory. That is, some or all of the memory on the second electronic device may be available to the camera for storing images.

Figure 3:
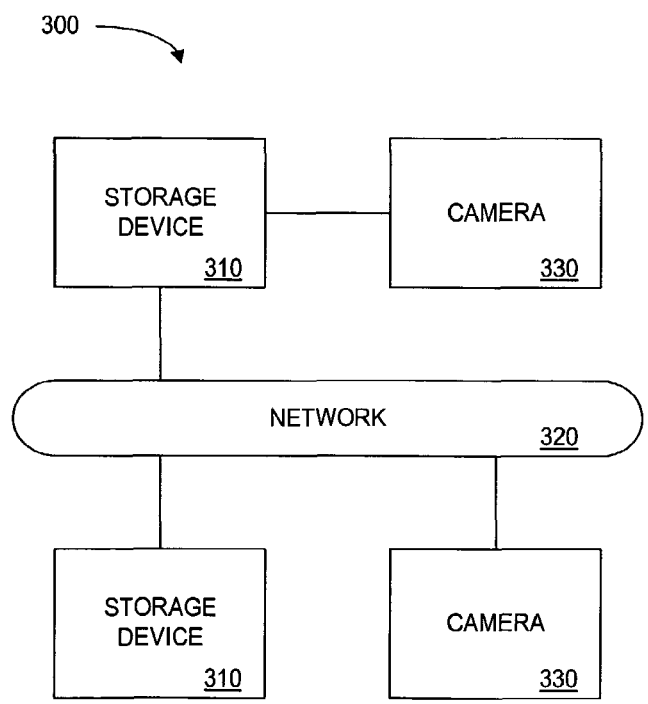
FIG. 3 shows a block diagram of a system that is consistent with at least one embodiment of the present invention.

Referring now to FIG. 3, a block diagram of a system 300 according to at least one embodiment of the present invention includes one or more storage devices 310 (e.g., a personal computer, a Web server, a hard drive) in communication, via a communications network 320, with one or more cameras 330 (e.g., digital camera, video camera, wireless phone with integrated digital camera). Each of the storage devices 310 and cameras 330 may comprise one or more computing devices, such as those based on the Intel Pentium® processor, that are adapted to communicate with any number and type of devices (e.g., other cameras and/or storage devices) via the communications network 320. Although only two cameras 330 and two storage devices 310 are depicted in FIG. 3, it will be understood that any number and type of cameras 330 may communicate with any number of storage devices 310 and/or other cameras 330 (and vice versa).

According to one or more embodiments of the present invention, a camera 330 may communicate with a storage device 310 in order to transmit one or more images to the storage device 310 (e.g., for storage).

A storage device 310 may be embodied in a variety of different forms, including, without limitation, a server, a mainframe computer (e.g., an SGI Origin™ server), a personal computer (e.g., a Dell Dimension™ computer), and a portable computer (e.g., an Apple iBook™ laptop, a Palm m515™ PDA, a Kyocera 7135™ cell phone).

Communication by and among any of the imaging devices, computing devices, and storage devices described herein (including the cameras 330 and the storage devices 310) may be direct or may be indirect, and may occur via a wired or wireless medium. Some, but not all, possible communication networks that may comprise network 320 (or may otherwise be part of system 300 and/or other exemplary systems described herein) include: a local area network (LAN), a wide area network (WAN), the Internet, a telephone line, a cable line, a radio channel, an optical communications line, and a satellite communications link. In yet other embodiments, the devices of the system 300 may communicate with one another over RF, cable TV, satellite links and the like. Some possible communications protocols that may be part of system 300 include, without limitation: Ethernet (or IEEE 802.3), SAP, ATP, Bluetooth™, IEEE 802.11, CDMA, TDMA, ultra-wideband, universal serial bus (USB), and TCP/IP. Optionally, communication may be encrypted to ensure privacy and to prevent fraud in any of a variety of ways well known in the art.

Of course, in lieu of or in addition to the exemplary communications means described herein, any appropriate communications means or combination of communications means may be employed in the system 300 and in other exemplary systems described herein. For example, communication may take place over the Internet through a Web site maintained by a remote server, or over an on-line data network including commercial on-line service providers, bulletin board systems and the like. In another example, using the wireless capabilities of his mobile phone, a user may upload an image captured using the integrated digital camera to his personal computer, or to a personal database of images on a Web server maintained by his telecommunications company. In another example, while a user is still away from home on vacation, the user's personal computer may receive, via a cable modem, a series of vacation snapshots taken by the user.

According to one or more embodiments of the present invention, a storage device 310 may comprise a server including an external or internal module associated with one or more of the cameras 330 and capable of communicating with one or more of the cameras 330 and of directing the one or more cameras 330 to perform one or more functions. For example, a server may be configured to execute a program for controlling one or more functions of a camera 330 remotely. Similarly, a camera 330 may comprise a module associated with one or more storage devices 310 that is capable of directing one or more storage devices 310 to perform one or more functions. For example, a camera 330 may be configured to direct a server to execute a facial recognition program on a captured image and to return an indication of the best matches to the camera 330 via the communication network 320.

A camera 330 may be operable to access one or more databases (e.g., of storage device 310). A camera 330 may also be operable to access a database (e.g., an image database) via the network 320 to determine what meta-information (e.g., information descriptive of an image) to associate with one or more images. For example, as discussed further herein, a database of images and/or image templates may be stored for a user on a storage device 310 (e.g., a server). Various functions of a camera 330 and/or the storage device 310 may be performed based on images stored in a personalized database. For instance, an image recognition program running on the server 310 (or on the camera 330) may use the user's personalized database of images for reference in identifying people, objects, and/or scenes in an image captured by the user. If, in accordance with one embodiment, the user has identified the content of some of the images in the database himself (e.g., by associating a meta-tag with an image), a match determined by the image recognition software with reference to the customized database is likely to be acceptable to the user (e.g., the user is likely to agree to a suggestion to associate a meta-tag from a stored reference image with the new image also).

Information exchanged by the exemplary devices depicted in FIG. 3 may include, without limitation, images and indications of changes in settings or operation of a camera 330 (e.g., an indication that a user or the camera 330 has altered an exposure setting). Other exemplary types of information that may be determined by the camera 330 and/or the storage device 310 and communicated to one or more other devices are described herein. A server, for example, may monitor operations of a camera 330 (and/or activity of a user) via the network 320. For instance, a server may identify a subject a user is recording images of and, optionally, use that information to direct the camera 330 to ask if the user would like to e-mail or otherwise transmit a copy of the captured image to the subject.

With respect to the various exemplary systems, devices, and methods discussed herein, those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

According to some embodiments, various processes may be performed by the camera 330 in conjunction with the storage device 310. For example, some steps of a described process may be performed by the camera 330, while other steps are performed by the storage device 310. As discussed herein, data useful in providing some of the described functionality may be stored on one of or both of the camera 330 and storage device 310 (and/or other devices).

In some embodiments, as discussed herein, the storage devices 310 may not be necessary and/or may not be preferred. For example, some embodiments of the present invention may be practiced using a camera 330 alone, as described herein. In such embodiments, one or more functions described as being performed by a storage device 310 (e.g., a server) may be performed by the camera 330, and some or all of the data described as being stored on a storage device 310 may be stored on the camera 330 or on another device in communication with the camera 330 (e.g., another camera, a PDA).

Similarly, in some embodiments the cameras 330 may not be necessary and/or may not be preferred. Accordingly, one or more functions described herein as being performed by the camera 330 may be performed by a server or other type of appropriately configured storage device, and some or all of the described as being stored on the camera 330 may be stored on the storage device 310 or on another device in communication with the storage device 310 (e.g., a PDA, a personal computer).

Several examples of types of cameras, storage devices, servers, and other devices are discussed herein, and other types consistent with various embodiments of the present invention will be readily understood by those of skill in the art in light of the present disclosure.

Figure 4:
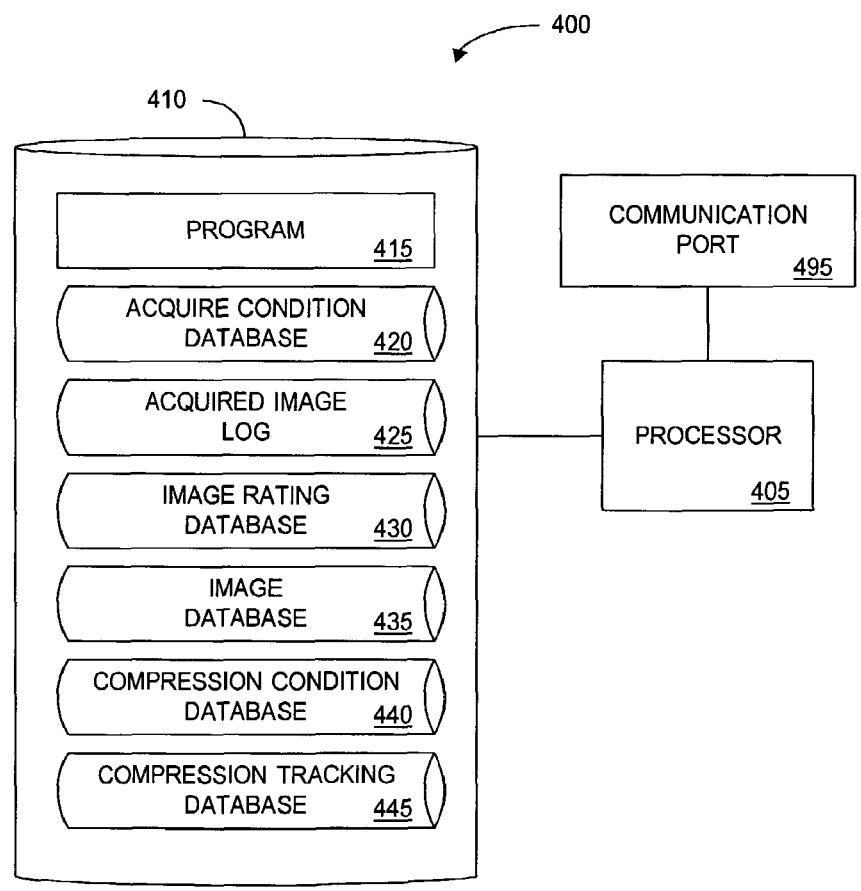
FIG. 4 shows a block diagram of a computing device that is consistent with at least one embodiment of the present invention.

Referring now to FIG. 4, illustrated therein is a block diagram of an embodiment 400 of computing device 330 (FIG. 3). The computing device 400 may be implemented as a system controller, a dedicated hardware circuit, an appropriately programmed general-purpose computer, or any other equivalent electronic, mechanical or electro-mechanical device. The computing device 400 may comprise, for example, a server computer operable to communicate with one or more client devices, such as an imaging device 220. The computing device 400 may be operative to manage the system 100, the system 200, the system 300, and/or the camera 210 and to execute various methods of the present invention.

In operation, the computing device 400 may function under the control of a user, remote operator, image storage service provider, or other entity that may also control use of an imaging device 110, camera 210, imaging device 220 and/or storage device 240. For example, the computing device 400 may be a Web server maintained by an Internet services provider, or may be a computer embodied in a camera 310 or camera 330. In some embodiments, the computing device 400 and an imaging device 110 may be different devices. In some embodiments, the computing device 400 and the imaging device 110 may be the same device. In some embodiments, the computing device 400 may comprise more than one computer operating together.

The computing device 400 comprises a processor 405, such as one or more Intel Pentium® processors. The processor 405 is in communication with a memory 410 and with a communication port 495 (e.g., for communicating with one or more other devices).

The memory 410 (as well as any of the various types of storage devices described herein) may comprise an appropriate combination of magnetic, optical and/or semiconductor memory, and may include, for example, Random Access Memory (RAM), Read-Only Memory (ROM), a compact disc and/or a hard disk. The processor 405 and the memory 410 may each be, for example: (i) located entirely within a single computer or other device; or (ii) connected to each other by a remote communication medium, such as a serial port cable, telephone line or radio frequency transceiver. In one embodiment, the computing device 400 may comprise one or more devices that are connected to a remote server computer for maintaining databases.

In the example depicted in FIG. 4, the memory 410 stores a program 415 for controlling the processor 405. The processor 405 performs instructions of the program 415, and thereby operates in accordance with the present invention, and particularly in accordance with the methods described in detail herein. The program 415 may be stored in a compressed, uncompiled and/or encrypted format. The program 415 furthermore includes program elements that may be necessary, such as an operating system, a database management system and "device drivers" for allowing the processor 405 to interface with computer peripheral devices. Appropriate program elements are known to those skilled in the art, and need not be described in detail herein.

Various forms of computer-readable media may be involved in carrying one or more sequences of one or more instructions to processor 405 (or any other processor of a device described herein) for execution. For example, the instructions may initially be borne on a magnetic disk of a remote computer. The remote computer can load the instructions into its dynamic memory and send the instructions over a telephone line using a modem. A modem local to a computing device 400 can receive the data on the telephone line and use an infrared transmitter to convert the data to an infrared signal. An infrared detector can receive the data carried in the infrared signal and place the data on a system bus for processor 405. The system bus carries the data to main memory, from which processor 405 retrieves and executes the instructions. The instructions received by main memory may optionally be stored in memory 410 either before or after execution by processor 405. In addition, instructions may be received via communication port 495 as electrical, electromagnetic or optical signals, which are exemplary forms of carrier waves that carry data streams representing various types of information. Thus, the computing device 400 may obtain instructions in the form of a carrier wave.

According to one embodiment of the present invention, the instructions of the program 415 may be read into a main memory from another computer-readable medium, such from a ROM to RAM. Execution of sequences of the instructions in program 415 causes processor 405 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 410 also preferably stores a plurality of databases, including an acquire condition database 420, an acquired image log 425, an image rating database 430, an image database 435, a compression condition database 440, and a compression tracking database 445. Examples of each of these databases are described in detail below and example structures are depicted with sample entries in the accompanying figures.

As will be understood by those skilled in the art, the schematic illustrations and accompanying descriptions of the sample databases presented herein are exemplary arrangements for stored representations of information. Any number of other arrangements may be employed besides those suggested by the tables shown. For example, even though a particular number of separate databases are illustrated, the invention could be practiced effectively using any number of functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and, likewise, object methods or behaviors can be used to implement the processes of the present invention.

Note that, although these databases are described with respect to FIG. 4 as being stored in one computing device, in other embodiments of the present invention some or all of these databases may be partially or wholly stored in another device, such as one or more imaging devices 110, one or more of the cameras 330, one or more of the storage devices 240 or 310, another device, or any combination thereof. Further, some or all of the data described as being stored in the databases may be partially or wholly stored (in addition to or in lieu of being stored in the memory 410 of the computing device 400) in a memory of one or more other devices.

Figure 5:
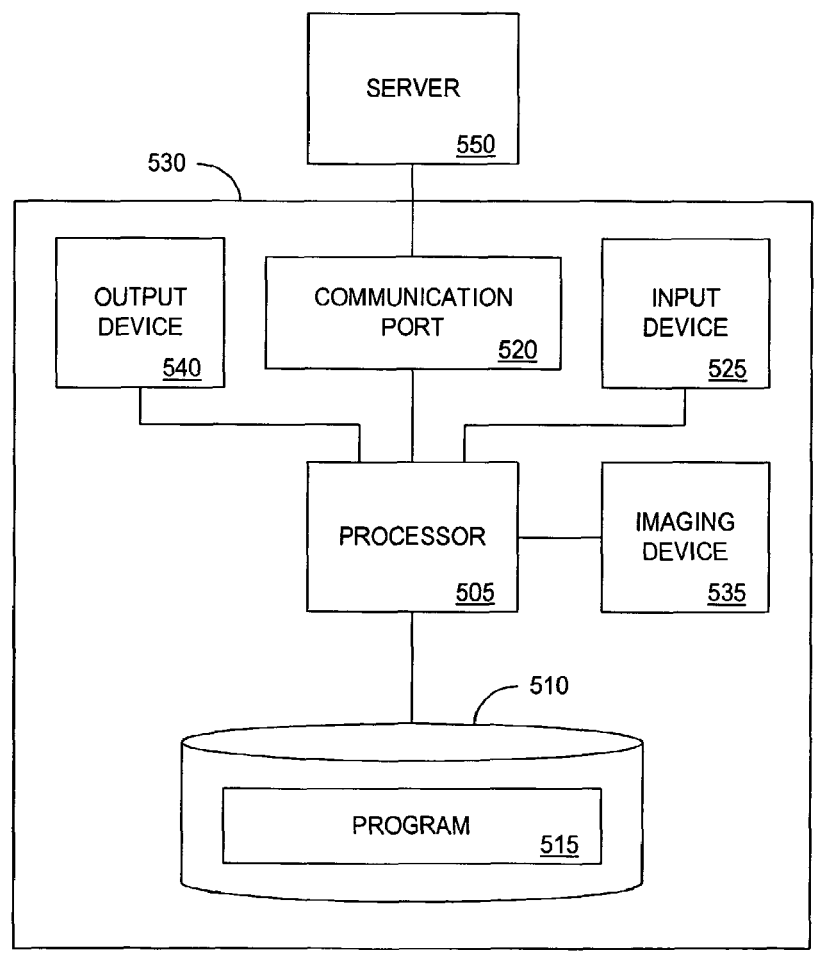
FIG. 5 shows a block diagram of a camera that is consistent with at least one embodiment of the present invention.

Referring now to FIG. 5, illustrated therein is a block diagram of an embodiment 530 of a camera in communication with a server 550 (e.g., via a communications network). The camera 530 may be implemented as a system controller, a dedicated hardware circuit, an appropriately configured computer, or any other equivalent electronic, mechanical or electro-mechanical device. The camera 530 may comprise, for example, any of various types of cameras well known in the art, including, without limitation, a still camera, a digital camera, an underwater camera, and a video camera. A still camera, for example, typically includes functionality to capture images that may be displayed individually. A single lens reflex (SLR) camera is one example of a still camera. A video camera typically includes functionality to capture movies or video (i.e., one or more sequences of images typically displayed in succession). A still image, movie file or video file may or may not include or be associated with recorded audio. It will be understood by those skilled in the art that some types of cameras, such as the Powershot A40™ by Canon U.S.A., Inc., may include functionality to capture movies and functionality to capture still images.

The camera 530 may comprise any or all of the cameras 330 of system 300 (FIG. 3) or the imaging device 110 (FIG. 1). In some embodiments, a user device such as a PDA or cell phone may be used in place of, or in addition to, some or all of the camera 530 components depicted in FIG. 5. Further, a camera 530 may comprise a computing device or other device operable to communicate with another computing device (e.g., a computing device 120).

The camera 530 comprises a processor 505, such as one or more Intel Pentium™ processors. The processor 505 is in communication with a memory 510 and a communication port 520 (e.g., for communicating with one or more other devices).

The memory 510 (as well as other types of memory and storage devices described herein) may comprise an appropriate combination of magnetic, optical and/or semiconductor memory, and may include, for example, Random Access Memory (RAM), Read-Only Memory (ROM), a programmable read only memory (PROM), a compact disc and/or a hard disk. The memory 510 may comprise or include any type of computer-readable medium. The processor 505 and the memory 510 may each be, for example: (i) located entirely within a single computer or other device; or (ii) connected to each other by a remote communication medium, such as a serial port cable, telephone line or radio frequency transceiver. In one embodiment, the camera 530 may comprise one or more devices that are connected to a remote server computer for maintaining databases.

According to some embodiments, memory 510 of camera 530 may comprise an image buffer (e.g., a high-speed buffer for transferring images from an image sensor) and/or a flash memory (e.g., a high-capacity, removable flash memory card for storing images). An example of a camera with an image buffer is depicted in FIG. 6B.

A wide variety of different types of memory and storage devices are possible and are known to those skilled in the art. For example, memory may be volatile or non-volatile; may be electronic, capacitive, inductive, or magnetic in nature; and may be accessed sequentially or randomly.

Memory may be volatile and/or non-volatile. As will be readily understood, most RAM is volatile (DRAM=Dynamic Random Access Memory), meaning that it is erased whenever the device is turned off. In contrast, EEPROMs (Electrically Erasable Programmable Read-Only Memory) like flash memory cards are non-volatile; images stored in a flash memory card will continue to be stored even after a device is turned off.

Memory may or may not be designed to be removable (e.g., by a user) from a device (e.g., camera 530, computing device 400). Many types of cameras, for example, may use one or more forms of removable memory, such as chips, cards, and/or discs, to store and/or to transfer images and other data. For instance, it is typically possible for a user to remove a flash memory card from a camera that accepts such memory (e.g., for transferring images to a personal computer), but it is typically difficult for a user to remove a camera's RAM or ROM (e.g., storing a program for various camera functions).

Some examples of removable non-volatile memory include, without limitation: a flash memory card, a hard drive, and a compact disc. A flash memory card is a variation of an EEPROM (Electrically Erasable Programmable Read-Only Memory). Some examples flash memory cards include CompactFlash™ cards, SmartMedia™ cards, Sony Memory Sticks™, MultiMediaCards™ (MMC) memory cards, and Secure Digital™ (SD) memory cards. Some examples of hard drives include IBM Microdrives™, which are small, lightweight hard drives. Some Microdrives™ may store up to 1 GB of information. Some examples of compact discs include CD-R (e.g., writeable) and CD-RW (e.g., rewriteable) recordable compact discs and DataPlay™ optical media. In another example, Sony's MVC-CD400 stores captured images on 8 cm CD-R/RW compact discs, making it easy for a user to transfer files from the camera to a personal computer.

Memory 510 (as well as other types of memory and storage devices discussed herein) may comprise any number of different types of memory. In some embodiments, different types of memory may be more suitable for different purposes. In some embodiments, memory 510 may comprise a primary memory and a secondary memory. Primary memory, for example, may be fast, expensive, volatile memory that is used by the processor 505 in performing various calculations. RAM is one common example of primary memory. An example of a camera including a RAM is depicted in FIG. 6B. In contrast, secondary memory may be slower, less expensive, and non-volatile memory that is used for storing information over a longer period of time. A hard disk is one example of a secondary memory.

It will be understood that different types of memory may run at different speeds and thus may be more suitable for different purposes. For example, a captured image buffer on a camera may store and access images very quickly, whereas it may take a relatively longer period of time to store or access data on a hard disc such as an IBM Microdrive. Those skilled in the art understand that there are a variety of different ways of measuring the speed of a memory.

It will be understood that memory may be read-only, rewriteable, or once-writeable. For example, ROM that stores a program for the camera may be read-only, whereas RAM used for image processing may be rewriteable. It will also be understood that memory may be internal or external. For example, a camera may store images on an internal RAM and/or on a digital wallet or other portable hard drive.

Referring again to FIG. 5, the memory 510 stores a program 515 for controlling the processor 505. The program 515 may comprise instructions (e.g., Digita® imaging software, image recognition software) for capturing images and/or for one or more other functions. The processor 505 performs instructions of the program 515, and thereby operates in accordance with the present invention, and particularly in accordance with the methods described in detail herein. The program 515 may be stored in a compressed, uncompiled and/or encrypted format. The program 515 furthermore includes program elements that may be necessary, such as an operating system, a database management system and "device drivers" for allowing the processor 505 to interface with computer peripheral devices. Appropriate program elements are known to those skilled in the art, and need not be described in detail herein.

According to one embodiment of the present invention, the instructions of the program 515 may be read into a main memory from another computer-readable medium, such from a ROM to RAM. Execution of sequences of the instructions in program 515 causes processor 505 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. In one embodiment, execution of sequences of the instructions in a program of a server 550 in communication with camera 530 may also cause processor 505 to perform some of the process steps described herein.

The memory 510 optionally also stores one or more databases, such as any of the exemplary databases described in FIG. 4. Examples of a memory of a camera storing various databases are discussed herein with respect to FIGS. 6A and 6B.

The processor 505 is preferably also in communication with one or more imaging devices 535 (e.g., a lens, an image sensor) embodied in the camera 530. Various types of imaging devices are discussed herein and in particular with respect to FIGS. 6A and 6B.

The processor 505 is preferably also in communication with one or more input devices 525 (e.g., a button, a touch screen) and output devices 540. Various types of input devices and output devices are described herein and in particular with respect to FIGS. 6A and 6B.

Such one or more output devices 540 may comprise, for example, an audio speaker (e.g., for outputting information to a user), an infra-red transmitter (e.g., for transmitting a suggested meta-tag to a user's PDA), a display device (e.g., a liquid crystal display (LCD)), a radio transmitter, and a printer (e.g., for printing an image).

An input device 525 is capable of receiving an input (e.g., from a user or another device) and may be a component of camera 530. An input device 525 may communicate with or be part of another device (e.g., a server, a PDA). For cameras, common input devices include a button or dial. Some other examples of input devices include: a keypad, a button, a handle, a keypad, a touch screen, a microphone, an infrared sensor, a voice recognition module, a motion detector, a network card, a universal serial bus (USB) port, a GPS receiver, a radio frequency identification (RFID) receiver, an RF receiver, a thermometer, a pressure sensor, and an infra-red port (e.g., for receiving communications from with a second camera or another device such as a smart card or PDA of a user).

Figure 6A:
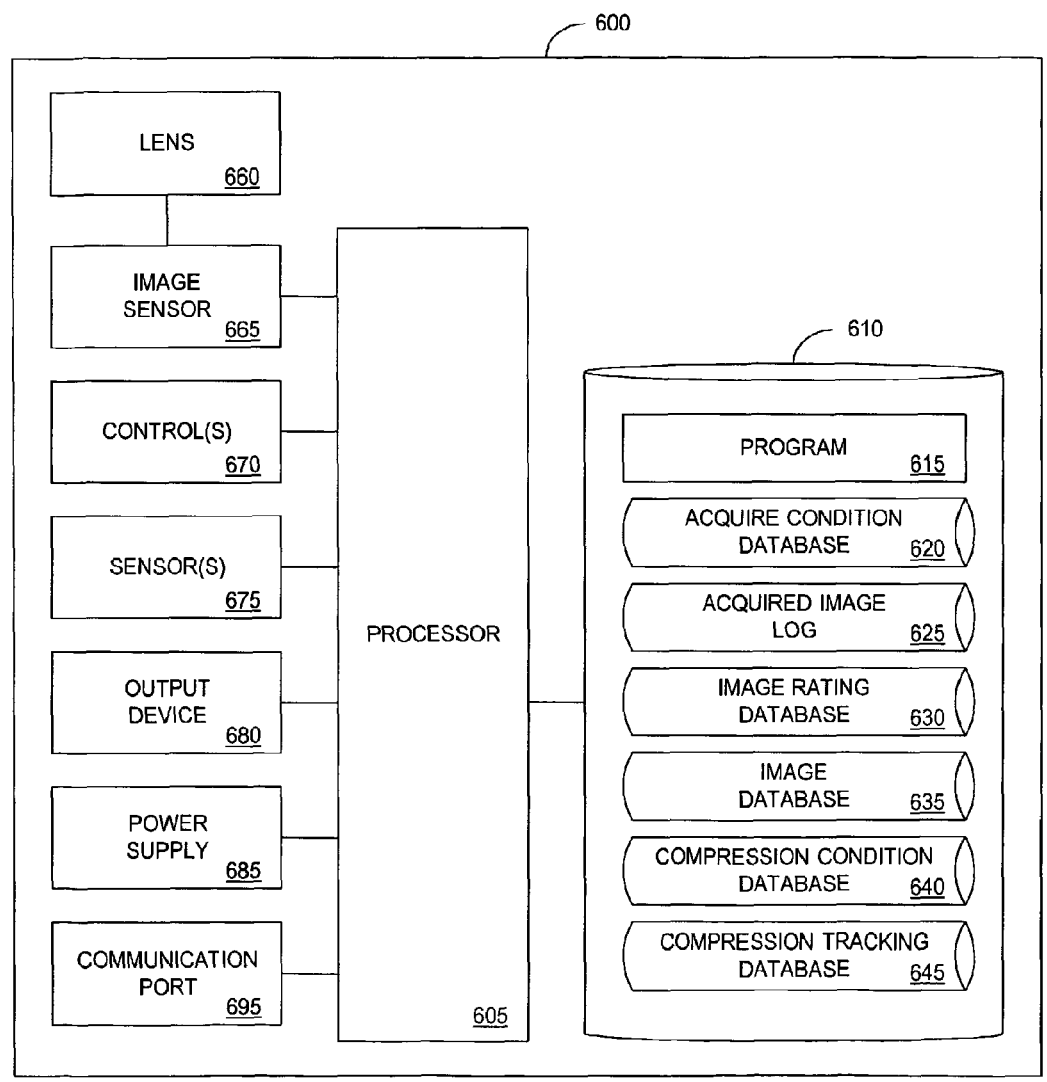
FIG. 6A shows a block diagram of an imaging device that is consistent with at least one embodiment of the present invention.
Figure 6B:
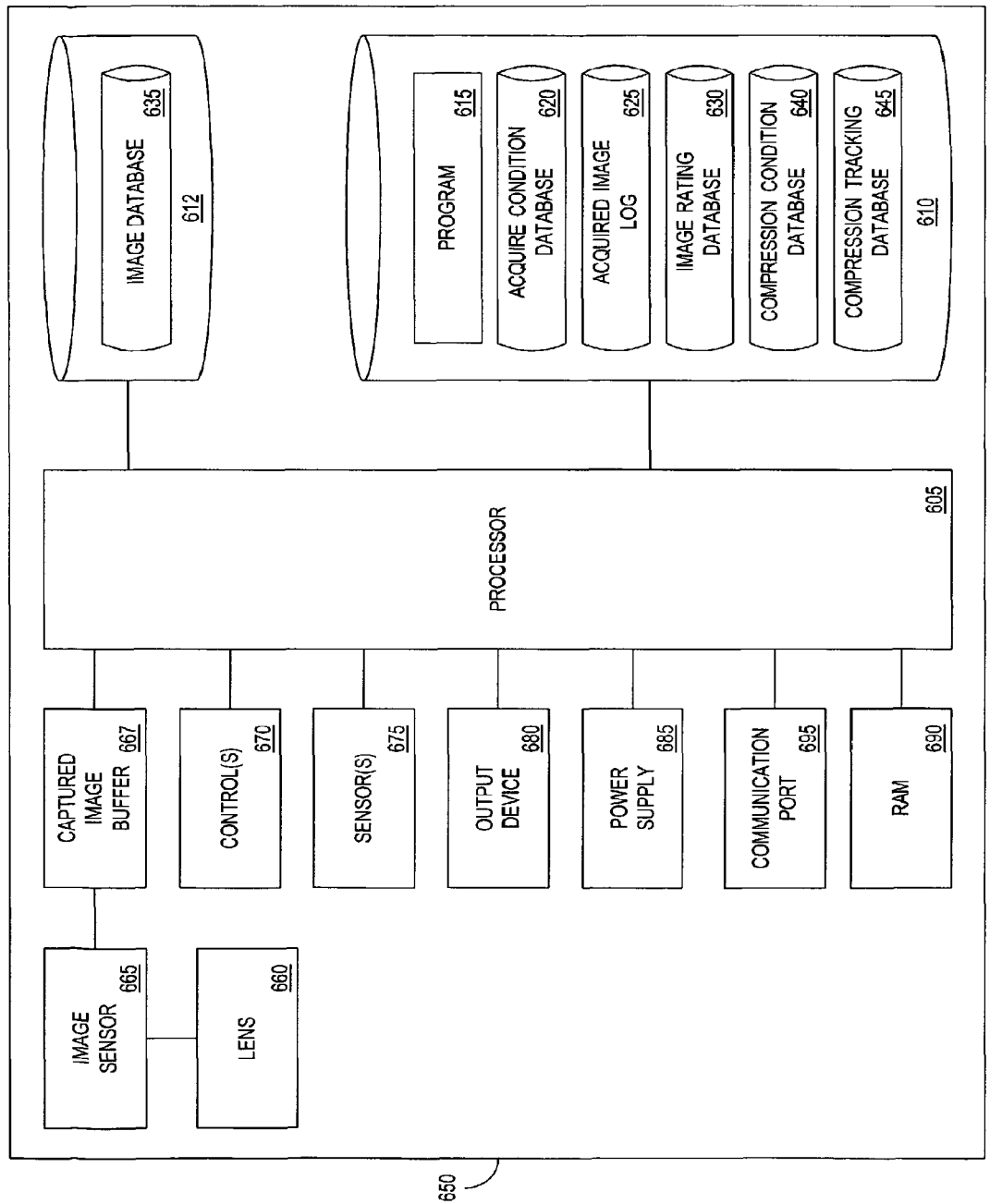
FIG. 6B shows a block diagram of an imaging device that is consistent with at least one embodiment of the present invention.

Referring now to FIG. 6A, illustrated therein is a block diagram of one embodiment 600 of a camera (e.g., camera 330 of FIG. 3, camera 530 of FIG. 5). The camera 600 comprises a processor 605, such as one or more Intel Pentium™ processors. The processor 605 is in communication with a memory 610 and a communication port 695 (e.g., for communicating with one or more other devices). The memory 610 may comprise or include any type of computer-readable medium, and stores a program 615 for controlling the processor 605. The processor 605 performs instructions of the program 615, and thereby operates in accordance with various processes of the present invention, and particularly in accordance with the methods described in detail herein.

The memory 610 stores a plurality of databases, including an acquire condition database 620, an acquired image log 625, an image rating database 630, an image database 635, a compression condition database 640, and a compression tracking database 645. Examples of each of these databases are described in detail below and example structures are depicted with sample entries in the accompanying figures.

The processor 605 is preferably also in communication (directly or indirectly) with a lens 660 (e.g., made of glass), an image sensor 665, one or more controls 670 (e.g., an exposure control), one or more sensors 675, one or more output devices 680 (e.g., a liquid crystal display (LCD)), and a power supply 685 (e.g., a battery, a fuel cell, a solar cell). Various examples of these types of components are described herein.

A processor of a camera 600 may be capable of executing instructions (e.g., stored in memory 610) such as software (e.g., for wireless and/or digital imaging, such as Digita® software from Flashpoint Technology, Inc.).

As indicated in FIG. 6A, a camera may include one or more input devices capable of receiving data, signals, and indications from various sources. Lenses, sensors, communication ports and controls are well known types of input devices.

Various types of lenses that may be used with cameras are well known, including telephoto, wide-angle, macro, and zoom lenses.

As will be understood by those of skill in the art, an image sensor may be an area that is responsive to light and may be used to capture an image. An image sensor may or may not be an electronic device. Some examples of image sensors include, without limitation: a CCD (Charge Coupled Device) and a CMOS (Complementary Metal Oxide Semiconductor) image sensor, such as the X3® PRO 10M™ CMOS image sensor by Foveon. An image sensor may comprise software or other means for image identification/recognition. "Image sensor" may be most often used to refer to an electronic image sensor, but those skilled in the art will recognize that various other technologies (e.g., a light sensitive film) may also function as image sensors.

A camera may include one or more output devices 680. Examples of output devices include, without limitation: a display (e.g., a color or black-and-white liquid crystal display (LCD) screen), an audio speaker (e.g., for outputting questions), a printer (e.g., for printing images), a light emitting diode (LED) (e.g., for indicating that a self-timer is functioning), and a touch screen. A display may be useful, for example, for displaying images and/or for displaying camera settings.

The camera 600 may also include one or more communication ports 695 for use in communicating with one or more other devices. For example, a USB (universal serial bus) or Firewire® (IEEE-1394 standard) connection port may be used to exchange images and other types of data with a personal computer or digital wallet (e.g., an Apple iPod™). The camera may be in communication with a cellular telephone, wireless-enabled PDA or other device capable of wireless communications. Images and other data may be transmitted to and from the camera 600 using such a wireless communications device. For example, the SH251I™ cellular telephone by Sharp Corporation includes a 3.1 megapixel CCD camera, and allows users to receive image files via e-mail. In yet another example, a camera may include a radio antenna for communicating with a radio beacon. For instance, a subject of a photo may carry a radio beacon that may communicate with the camera and provide information that is useful in determining settings for the camera (e.g., information about the light incident on the subject).

As will be understood by those skilled in the art, a camera may include one or more controls 670 or other input devices. Examples of controls 670 include, without limitation: a button (e.g., a shutter button), a switch (e.g., an on/off switch), a dial (e.g., a mode selection dial), a keypad, a touch screen, a microphone, a bar code reader (e.g., such as the one on the 1991 version of the Canon EOS Elan™), a remote control (e.g., such as the one on the Canon Powershot G2™), a sensor, a trackball, a joystick, a slider bar, and a continuity sensor.

Controls 670 of the camera 600 or other type of imaging device may be used to perform a variety of functions. In accordance with various embodiments of the present invention, a control may be used, without limitation, to adjust a setting or other parameter, provide an indication (e.g., a response to a prompt), or operate the camera. For example, a user may press the shutter button on the camera to capture an image. Controls may be used to adjust one or more settings on the camera. For example, a user may use "up" and "down" buttons on a camera to adjust the white balance on the camera. In another example, a user may use a mode dial on the camera to select a plurality of settings simultaneously. For example, a user may use a control to indicate to the camera that he would like stored images to be compressed, or to any adjust any of various other types of parameters of how the camera is to operate and/or interact with the user. In another example, a user may use a control to indicate to the camera that he would like the camera to provide audio prompts that guide him in capturing images. As discussed herein, controls may be used to provide an indication to the camera. For example, the camera may output a question to a user (e.g., "Are you taking a picture of a sunset?") and the user may use a control to indicate his response to the question.

Various types of sensors 675 that may be included in a camera 600 include, without limitation: a light sensor, a proximity sensor (e.g., to determine whether a user is looking through a viewfinder of the camera), a motion sensor (e.g., to detect movement of the camera), an accelerometer, an image sensor, a range sensor (e.g., for determining the distance to a subject), a microphone (e.g., for recording audio that corresponds to a scene), a global positioning system (GPS) device (e.g., for determining a camera's location), a camera orientation sensor (e.g., an electronic compass), a tilt sensor (e.g., for determining a camera's orientation), an altitude sensor, a humidity sensor, a clock (e.g., indicating the time of day, day of the week, month, year), and a temperature/infrared sensor.

According to some embodiments, a microphone may be useful for allowing a user to control the camera using voice commands. Voice recognition software (e.g., ViaVoice™ from IBM Voice Systems, OpenSpeech from Speechworks International, Nuance 8.0 from Nuance Communications, and Dragon Naturally Speaking from Dragon Systems) is known to those skilled in the art and need not be described further herein.

Referring now to FIG. 6B, illustrated therein is a block diagram of another embodiment 650 of a camera. Like the camera 600 depicted in FIG. 6A, the exemplary camera 650 of FIG. 6B comprises a processor 605 in communication (directly or indirectly) with a memory 610, a communication port 695, a lens 660, an image sensor 665, one or more controls 670, one or more sensors 675, one or more output devices 680, and a power supply 685. Various examples of these types of components are described herein.

The memory 610 may comprise or include any type of computer-readable medium, and stores a program 615 for controlling the processor 605. The processor 605 performs instructions of the program 615, and thereby operates in accordance with various processes of the present invention, and particularly in accordance with the methods described in detail herein. The memory 610 stores a plurality of databases, including an acquire condition database 620, an acquired image log 625, an image rating database 630, a compression condition database 640, and a compression tracking database 645.

One difference between the camera 600 (FIG. 6A) and the camera 650 (FIG. 6B) is that camera 650 includes different exemplary allocations of memory (which may or may not be different types of memory). In addition to the memory 610, processor 605 is in communication with a memory 612 storing an image database 635. In one embodiment, the memory 612 is a removable non-volatile memory for storing images (e.g., in the image database 635). In one embodiment, the memory 610 is non-removable non-volatile memory.

Processor 605 of camera 650 is also in communication with a RAM 690 that may be useful in some embodiments for executing instructions (e.g., of the program 615).

Processor 605 of camera 650 is also in communication with a captured image buffer 667 for transferring images from the image sensor 665. In one embodiment, the captured image buffer 667 comprises RAM.

Of course, it will be understood in light of the present disclosure that various other embodiments are also possible, including embodiments with different types of memory or arrangements of memory. For example, images may be stored in a memory that is not removable. In such an embodiment, a communication port of a camera may be used to transfer images to another device (e.g., server 550, computing device 120).

As will be understood by those skilled in the art, a setting for a camera may be a parameter that affects how the camera operates (e.g., how the camera captures at least one image). Examples of types of settings on a camera include, without limitation: exposure settings, lens settings, digitization settings, flash settings, multi-frame settings, power settings, output settings, function settings, and mode settings. Some more detailed examples of these types of settings are discussed further below.

Exposure settings may affect the exposure of an acquired image. Examples of exposure settings include, without limitation: shutter speed, aperture, image sensor sensitivity (e.g., measured as ISO or ASA), white balance, color hue, and color saturation.

Lens settings may affect a lens on a camera and/or how a lens acquires an image. Examples of lens settings include, without limitation: focus (e.g., near or far), optical zoom (e.g., telephoto, wide angle), optical filters (e.g., ultraviolet, prism), an indication of which lens to use (e.g., for a camera that has multiple lenses) or which portion of a lens to use, field of view, and image stabilization (e.g., active or passive image stabilization).

Digitization settings may affect how a camera creates a digital representation of an image. Examples of digitization settings include, without limitation: resolution (e.g., 1600× 1200 or 640×480), compression (e.g., for an image that is stored in JPG format), color depth/quantization, digital zoom, and cropping. For instance, a cropping setting may indicate how the camera should crop an acquired digital image when storing it to memory.

In some embodiments, a compression setting may be a parameter used by an image compression program to determine how much an image is compressed. In some embodiments, a compression setting for an image may be determined based on an image rating and/or how an image is acquired.

Flash settings may affect how a flash on a camera operates. Examples of flash settings include, without limitation: flash brightness, red-eye reduction, and flash direction (e.g., for a bounce flash).

Multi-frame settings may affect how a camera captures a plurality of images. Examples of multi-frame settings include, without limitation: a burst mode (e.g., taking a plurality of pictures in response to one press of a shutter button), auto-bracketing (e.g., taking a plurality of pictures with different exposure settings), a movie mode (e.g., capturing a movie), and image combination (e.g., using Canon's Photo-Stitch™ program to combine a plurality of images into a single image).

Power settings may affect the supply of power to one or more of a camera's electronic components. Examples of power settings include, without limitation: on/off and "Power-Save" mode (e.g., various subsystems on a camera may be put into "Power-Save" mode to prolong battery life).

Output settings may affect how the camera outputs information (e.g., to a user, to a server, to another device). Examples of output settings include, without limitation: language (e.g., what language is used to output prompts, questions, or other information to a user), viewfinder settings (e.g., whether a digital viewfinder on the camera is enabled, how a heads-up-display outputs information to a user), audio output settings (e.g., whether the camera beeps when it captures an image, whether questions may be output audibly), and display screen settings (e.g., how long the camera displays images on its display screen after capturing them).

In accordance with one or more embodiments of the present invention, a camera may be operable to acquire images and to perform one or more of a variety of other functions. A function setting may cause one or more functions to be performed (and/or prevent one or more functions from being performed). For example, if an auto-rotate setting on a camera is enabled, then the camera may automatically rotate a captured image so that it is stored and displayed right side up, even if the camera was held at an angle when the image was captured. Other examples of functions that may be performed by a camera include, without limitation: modifying an image (e.g., cropping, filtering, editing, adding meta-tags), cropping an image (e.g., horizontal cropping, vertical cropping, aspect ratio), rotating an image (e.g., 90 degrees clockwise), filtering an image with a digital filter (e.g., emboss, remove red-eye, sharpen, add shadow, increase contrast), adding a meta-tag to an image, displaying an image (e.g., on a LCD screen of the camera), and transmitting an image to another device (e.g., a personal computer, a printer, a television).

One way to adjust a setting on the camera is to change the camera's mode. For example, if the camera were to be set to "Fluorescent Light" mode, then the settings of the camera would be adjusted to the exemplary values listed in this column (i.e., the aperture would be set to automatic, the shutter speed would be set to $1/125$ sec, the film speed would be set to 200 ASA, etc.).

In accordance with some embodiments of the present invention, a mode refers to one or more parameters that may affect the operation of the camera. A setting may be one type of parameter. Indicating a mode to the camera may be a convenient way of adjusting a plurality of settings on the camera (e.g., as opposed to adjusting each setting individually). There are many types of modes. Some types, for example, may affect settings (e.g., how images are acquired). Some exemplary modes are discussed herein, without limitation, and other types of modes will be apparent to those skilled in the art in light of the present disclosure. A "Sports" mode, for example, may describe settings appropriate for capturing images of sporting events (e.g., fast shutter speeds). For instance, a user may operate a control (e.g., a dial) to indicate that the camera should be in "Sports" mode, in which the shutter speed on the camera is faster than $1/250$ sec and burst capturing of three images is enabled. An exemplary "Fluorescent Light" mode may establish settings appropriate for capturing images under fluorescent lights (e.g., white balance). A "Sunny Beach" mode may describe settings appropriate for capturing images on sunny beaches, and a "Sunset" mode may describe settings appropriate for capturing images of sunsets (e.g., neutral density filter). An exemplary "Portrait" mode may establish settings appropriate for capturing close-up images of people (e.g., adjusting for skin tones). A "Power-Save" mode may describe settings appropriate for minimizing the amount of power consumed by a camera. A "Silent" mode may describe settings that prevent the camera from making noises (e.g., audible beeps). A "Macro" mode may describe settings appropriate for capturing images that are within a predetermined distance of a camera.

3. Databases

Referring now to FIG. 7, an exemplary tabular representation 700 illustrates one embodiment of acquire condition database 420 (or acquire condition database 620) that may be stored, for example, in an imaging device 110 and/or computing device 120. The tabular representation 700 of the acquire condition database includes a number of example records or entries, each defining a condition that may be useful for determining whether one or more images should be acquired. Those skilled in the art will understand that the acquire condition database may include any number of entries.

The tabular representation 700 also defines fields for each of the entries or records. The exemplary fields specify: (i) an acquire condition identifier 705 that uniquely identifies a particular acquire condition, and (ii) an acquire condition 710 that includes an indication of a condition for acquiring at least one image.

An acquire condition database may be useful for various types of processes described herein. In some embodiments, an acquire condition database may be used to store conditions. If, for example, a processor (e.g., processor 405) determines a stored acquire condition to be true, the processor may direct an imaging device (e.g., imaging device 210) to acquire one or more images (e.g., automatically). For instance, an example acquire condition 705 identified as "AC-47532524-01" corresponds to a condition 710 described by "(CAMERA_VIEWFINDER.IN_USE='TRUE')." According to this example entry, if a camera viewfinder is in use, the camera will automatically acquire at least one image.

Referring now to FIG. 8, an exemplary tabular representation 800 illustrates one embodiment of acquired image log 425 (or acquired image log 625) that may be stored, for example, in a computing device 400, computing device 120, storage device 240, and/or camera 530. The tabular representation 800 of the acquired image log includes a number of example records or entries, each describing an acquired image. Those skilled in the art will understand that the image database may include any number of entries.

The tabular representation 800 also defines fields for each of the entries or records. The exemplary fields specify: (i) an image identifier 805 that uniquely identifies an image, (ii) a time 810 that indicates when the image was acquired, (iii) a reason 815 that indicates why the image was acquired, (iv) an overall rating 820 that indicates a quality of the image, (v) an image stored 825 that indicates if the acquired image is stored (e.g., in a secondary memory), and (vi) a compression setting 830 that indicates a value of a compression setting associated with the image (if any).

In some embodiments, an image may be acquired (e.g., automatically) by an imaging device in response to a determination (e.g., by a processor) that an acquire condition is satisfied. In some embodiments, the reason 815 may store one or more acquire condition identifiers corresponding to respective acquire conditions that were satisfied and thus prompted an imaging device to acquire the corresponding image(s) automatically. In some embodiments, the reason 815 may include a description of a corresponding acquired condition (e.g., such as condition 710).

In some embodiments, the reason 815 may store an indication that an acquired image was acquired in response to some manual interaction of a user with an imaging device, such as the user initiating a self-timer of a camera or using a shutter button. In one example, the sample data in the tabular representation 800 indicates that an image identified as "WEDDING-02" was acquired because a "USER PRESSED SHUTTER BUTTON."

As discussed herein, in some embodiments an overall rating 820 may be determined for an image that indicates a quality of the image. As also discussed herein, in some embodiments a processor may determine (e.g., based on a quality of an image) whether to store (e.g., in a removable memory) an image that was acquired (e.g., automatically). For example, an automatically-acquired image may only be stored in a flash memory card if it has an overall rating 820 of "4.0" or greater. The information in image stored 825 preferably includes an indication (e.g., "YES," "NO") of whether the corresponding acquired image was also stored (e.g., in a memory other than an image buffer).

The tabular representation 800 includes some example entries of acquired images. For instance, the sample data in the tabular representation 800 indicates that an image identified as "WEDDING-01" was acquired based on the acquire condition identified as "AC-47532524-01" at "1:40 PM Aug. 3, 2002." The image is associated with an overall rating of "7.7" and was stored at a compressing setting of "95%." The example overall rating 825 for "WEDDING-01" corresponds to the overall rating 1025 and 930 depicted in the example image database (FIG. 10) and example image rating database 430 (FIG. 9) for that image, respectively. In another example, an image identified as "WEDDING-02" was acquired because a "USER PRESSED SHUTTER BUTTON" and stored at a compression setting of "95%." In another example, an acquired image identified as "WEDDING-03" with an overall rating of "3.4" was not stored.

Referring now to FIG. 9, an exemplary tabular representation 900 illustrates one embodiment of an image rating database 430 (or image rating database 630) that may be stored, for example, in a computing device 400, imaging device 110, camera 600, and/or storage device 240. The tabular representation 900 of the image rating database includes a number of example records or entries, each describing one or more ratings associated with an acquired image. Those skilled in the art will understand that the image database may include any number of entries.

The tabular representation 900 also defines fields for each of the entries or records. The exemplary fields specify: (i) an image identifier 905 that uniquely identifies an acquired image, (ii) an exposure rating 910 that includes a description or other indication of the exposure of the acquired image, (iii) a sharpness rating 915 that includes a description or other indication of the sharpness of the acquired image, (iv) a composition rating 920 that includes a description or other indication of the composition of the acquired image, (v) a subject rating 925 that includes a description or other indication of the subject of the acquired image, and (vi) an overall rating 930 that includes a description or other indication of the quality of an acquired image (e.g., based on one or more types of ratings).

In some embodiments, the image identifier 905 may correspond to an image identifier stored in an acquired image log (e.g., as depicted in FIG. 8) and/or stored in an image database (e.g., as depicted in FIG. 10).

According to some embodiments of the present invention, methods and apparatus are provided for determining ratings of an image in one or more categories. Such ratings may be represented as numerical values (as depicted in the sample data of FIG. 9), but of course may be expressed in any of various other ways, such as a letter- or word-based grading system (e.g., "A," "B," "GOOD," "POOR"), deemed appropriate for describing a particular characteristic of an image. In the sample data of FIG. 9, a higher numerical rating corresponds to a determination of a higher quality in the corresponding category (e.g., exposure, composition). As described herein, ratings may be useful, in accordance with some embodiments, for determining whether to store an acquired image and/or for determining whether to compress or delete an image.

An exposure rating 910 preferably indicates the relative quality of the exposure of an acquired image. For instance, an over- or under-exposed image may receive a lower exposure rating than a properly exposed image.

A sharpness rating 915 preferably indicates the relative sharpness or level of focus of an image. For instance, a sharper image may have a higher sharpness rating than a blurred or poorly focused image.

A composition rating 920 preferably indicates the relative quality of how an image is composed. For instance, an image that is well-oriented and centered may receive a higher composition rating than an image that is not aimed as precisely.

A subject rating 925 preferably includes an indication of how interesting the subject might be to a user of a camera. For instance, a higher subject rating may indicate that a user does (or is likely to) find an image's subject more interesting than an image with a lower subject rating. In some embodiments, images acquired manually (e.g., by a user pressing a shutter button) are not rated for subject because it may be assumed that images acquired manually are interesting to a user of a camera. Alternatively, for the same reason, manually-acquired images may be assigned the highest subject rating (or any other predetermined subject rating).

An overall rating 930 preferably includes an indication of the relative quality of an image based on one or more ratings in a respective category. For example, the overall rating 930 of an automatically-captured image may be equal to the average of the ratings in all rating categories (e.g., subject, sharpness) for that image. For instance, the overall rating 930 for the image "WEDDING-01" is depicted as "7.7," which is the numerical average of the indicted exposure rating 910 ("8.5"), sharpness rating 915 ("7.2"), composition rating 920 ("7.1") and subject rating 925 ("8.0").

Referring now to FIG. 10, an exemplary tabular representation 1000 illustrates one embodiment of image database 435 (or image database 635) that may be stored, for example, in a computing device 120, server 550, and/or storage device 240. The tabular representation 1000 of the image database includes a number of example records or entries, each describing a captured image. Those skilled in the art will understand that the image database may include any number of entries.

The tabular representation 1000 also defines fields for each of the entries or records. The exemplary fields specify: (i) an image identifier 1005 that uniquely identifies an image, (ii) an image format 1010 that indicates a format of a file storing the image, (iii) a file size 1015 that indicates a size of the file storing the image, (iv) a method 1020 that indicates how an image was captured (e.g., manually or automatically), (v) an overall rating 1025 that indicates a quality of the image, and (vi) meta-data 1030 that indicates any of various types of supplemental information (e.g., keyword, category, subject, description, location, camera settings when the image was captured) associated with the image.

With respect to the image identifier 1005, in some embodiments a camera may automatically assign an identifier to an image. In some embodiments a user may use a control (e.g., a keypad) of a camera to indicate an identifier for an image (and/or to modify an identifier previously assigned to the image).

With respect to the image format 1010, images may be stored in a variety of different file formats. Some examples of formats include, without limitation: JPEG (a lossy, compressed 24-bit color image storage format developed by Joint Photographic Experts Group), JFIF (JPEG File Interchange Format), TIFF (Tagged Image File), BMP (Microsoft Windows Bitmap), RAW (a file format that is native to a camera), PicSurf variable resolution file format, Kodak Photo CD (Image Pac), and PICT (Macintosh Picture).

It will be understood by those skilled in the art that a variety of different types of meta-data 1030 are possible, including position (e.g., GPS coordinates where the image was captured), orientation (e.g., of the camera), altitude, camera settings (e.g., aperture and shutter speed used to capture the image, auto-bracketing settings), illumination (e.g., daylight, tungsten, florescent, IR, flash), lens setting (e.g., distance, zoom position, macro), scene data (e.g., "blue sky," "water," "grass," "faces"), subject motion, image content (e.g., subjects), image categorization, sound annotations, date and time (e.g., when an image was captured), preferred cropping, and scale. In some embodiments, the method 1020 and/or the overall rating 1025 may be considered meta-data and may be included (alternatively or in addition) in meta-data 1030. Other types of meta-data, meta-tagging and meta-information are discussed herein.

The tabular representation 1000 includes some example entries of captured images. For instance, an image identified as "WEDDING-01" is described as being in a "JPEG" image format. Other example formats include Tagged Image File Format (TIFF) and RAW, which may refer to a file format that is native to a particular camera (e.g., an uncompressed, unprocessed format). "WEDDING-01" has an indicated file size of "1494 KB" was captured with a method described as "AUTOMATIC." The image is associated with an overall rating of "7.7" and with the meta-data, "SUBJECTS: ALICE, BOB." The overall rating 1025 for "WEDDING-01" corresponds to the overall rating 820 and 930 depicted in the example image acquired log 425 (FIG. 8) and example image rating database 430 (FIG. 9) for that image, respectively.

An image database may be useful for various types of processes described herein. In some embodiments, an image database may be used to store images and/or information about images acquired and stored by a camera (e.g., camera 210, camera 530). For example, as discussed further herein, a camera may acquire an image and rate the acquired image. If, according to various considerations, it is determined that the acquired image should be stored (e.g., in a secondary memory), information about the stored image (and/or the stored image) may be stored in an image database. In some embodiments, information about images that were not stored in a secondary memory is not stored in the image database 435. For example, image "WEDDING-03," described in FIG. 8 and FIG. 9, is not included in the tabular representation 1000 of the image database 635 (e.g., because its overall rating of "3.4" is lower than a predetermined threshold for storing the image).

In some embodiments, an image file may be stored in an image database (e.g., in a corresponding record of image database 635). In other embodiments, an image database may store an indication of a pointer (e.g., a filepath, a memory address) to where an image file is stored. In some embodiments, the image identifier (e.g., image identifier 905 or 1005) may comprise such a pointer.

In some embodiments, image database 635 may be stored in a removable, non-volatile memory.

In accordance with some embodiments, as discussed further herein, storing an image may include compressing the image. Compressing an image may include determining a representation of an image that may be stored in less space. For example, an image that would require 10 Mb of memory to store in an uncompressed format may be compressed so that it only occupies 1 Mb of memory. Compressing an image is particularly useful for reducing the amount of memory required to store an image and thereby increasing the number of images that the camera may store in memory. Various forms of image compression and algorithms or processes are known to those skilled in the art for compressing images and need not be described in detail herein. Some examples of image compression include JPEG, a lossy form of compression, and LZW (Lempel-Ziv-Welch), a lossless form of compression used in the GIF and TIFF file formats.

Referring now to FIG. 11, an exemplary tabular representation 1100 illustrates one embodiment of compression condition database 440 (or compression condition database 640) that may be stored, for example, in an imaging device 110, server 550 and/or camera 650. The tabular representation 1100 of the compression condition database includes a number of example records or entries, each defining a condition that may be useful for determining whether one or more images should be compressed or deleted. Those skilled in the art will understand that the compression condition database may include any number of entries.

The tabular representation 1100 also defines fields for each of the entries or records. The exemplary fields specify: (i) a compression condition 1105 that includes an indication of a condition for compressing one or more images, (ii) a selection condition 1110 that includes an indication of a condition for selecting one or more images to compress, and (iii) an amount to compress 1115 that includes an indication of how much to compress one or more selected images.

A compression condition database may be useful for various types of processes described herein. In some embodiments, a compression condition database may be used to store one or more compression conditions. If, for example, a processor (e.g., processor 405) determines a stored compression condition has been met, the processor may direct a computing device (e.g., computing device 220) or an imaging device (e.g., imaging device 210, camera 530) to compress or delete one or more images (e.g., automatically). Compression (and/or deletion) of image files may be useful for managing memory for storing images. For instance, compressing or deleting an image may free up memory for capturing additional images.

It will be readily understood that an image may be compressed based on one or more compression parameters. For example, one or more compression parameters may affect how a computer program compresses an image. One common type of compression parameter is a compression setting, such as amount to compress 1115, which may affect how an image is compressed. For example, many JPEG image compression programs allow a user to specify a compression setting or quality setting on a 0-100 scale, with 0 corresponding to a high level of compression (and smaller file size) and 100 corresponding to a lower level of compression (and larger file size). The compression setting used in these JPEG image compression programs is often referred to as a percentage (e.g., 20% compression, 76% compression), even though this compression setting seldom reflects the actual compression ratio achieved by the compression. As is known to those skilled in the art, different image compression programs may operate based on different compression parameters, including different compression settings.

The tabular representation 1100 includes example data that may be stored in a compression condition database. For instance, one example compression condition 1105 is described by "(AMOUNT_OF_FREE_MEMORY<10 MB)." According to this example entry, if an amount of free memory available to an imaging device is less than 10 MB, it may be determined (e.g., by a processor 405 or 505) to compress one or more images. In some embodiments, if a compression condition is true, a corresponding selection condition may be used to identify one or more stored images to compress. For instance, the example compression condition 1105 discussed above is associated with a selection condition 1110 described by "(IMAGE_CAPTURED_AUTOMATICALLY) AND IMAGE_RATING<=7.0)." According to this example entry, an image may be selected for compression (e.g., automatically by the processor 405) if the image was (i) captured automatically and (ii) has an image rating (e.g., an associated overall rating) that is less than "7.0." Any number of images meeting these criteria may be selected, as deemed appropriate for the particular application. In some embodiments, if one or more images are selected for compression, how much a particular image is compressed may be based on a mathematical formula or other condition. According to the sample entry, if an image is selected based on the example selection condition 1110, it will be compressed (e.g., in accordance with an image compression program) based on the formula indicated in the amount to compress 1115, which indicates that a compression of "70%" will be applied if the associated image rating is between "6.0" and "7.0." A compression of "60%" will be applied if the rating is less than or equal to "6.0."

Referring now to FIG. 12, an exemplary tabular representation 1200 illustrates one embodiment of compression tracking database 450 (or compression tracking database 650) that may be stored, for example, in an imaging device 110, server 550 and/or camera 650. The tabular representation 1200 of the compression tracking database includes a number of example records or entries, each indicating information about a respective image. Those skilled in the art will understand that the compression tracking database may include any number of entries.

The tabular representation 1200 also defines fields for each of the entries or records. The tabular representation 1200 also defines fields for each of the entries or records. The exemplary fields specify: (i) an image identifier 1205 that uniquely identifies an image, (ii) an original file size 1210 that indicates a size of the file including the image when it was first stored, (iii) selected for compression 1215 that indicates whether the corresponding image has been selected for compression, and (iv) a current file size 1220 that indicates a current size of the file including the image.

In some embodiments, the compression tracking database may indicate a previous file size of an image, which may or may not be the same as a file size of an image when it was first stored.

In some embodiments, the original file size 1210 indicates a size of a file that is uncompressed. In other embodiments, the original file size 1210 may indicate a size of a file that is compressed (e.g., where a camera automatically compresses a file when it first stores it).

The selected for compression 1215 preferably indicates (e.g., "YES," "NO") whether an image has been selected for compression (e.g., based on a selection condition 1110 (FIG. 11)).

In some embodiments, current file size 1220 will be the same as the original file size 1210 if the corresponding image has not been compressed (or if the image has not been compressed any further).

In some embodiments, the compression tracking database may include information about one or more of (i) an amount of memory used before one or more images are compressed, (ii) an amount of memory used after one or more images are compressed, and (iii) an amount of memory made available (e.g., freed up) by compressing one or more images.

The tabular representation 1200 includes example data that may be stored in a compression tracking database. For instance, with respect to the sample record for an image "WEDDING-01," the original file size was "1494 KB," the image is not selected for compression, and the current file size is also "1494 KB." In another example, the image "WEDDING-04" had an original file size of "968 KB," was selected for compression, and now has a current file size of "586 KB."

4. Processes

An image may be captured based one or more settings. For example, an image that is captured by a camera may depend on the current aperture, shutter speed, zoom, focus, resolution, and compression settings. Similarly, an image may be captured based on a current mode of the camera (e.g., "Sunset" mode, "Sunny Beach" mode). For example, the camera may have a "Sunset" mode, which describes settings appropriate for capturing images of sunsets.

In accordance with some embodiments of the present invention, images may be captured (e.g., using an imaging device 110) in a variety of ways. It will be readily understood that some types of cameras may capture one or more images based on or in response to an indication by a user. For instance, a user may operate a control on a camera (e.g., a shutter button) to capture an image. Some examples, without limitation, include: a camera may capture an image when a user presses the shutter button on the camera, a camera may capture an image based on a self-timer set by a user, a camera may capture an auto-bracketed set of images in response to a user pressing the shutter button, and a camera may capture a sequence of images (e.g., of a sporting event) in response to a user holding down the shutter button on the camera (e.g., when the camera is in a burst mode).

Various embodiments of the present invention provide for methods and apparatus for capturing an image automatically and/or capturing an image manually. It will be readily understood that capturing an image manually may include receiving an indication from a user that an image should be captured. Some examples of receiving an indication from a user include, without limitation: a user pressing a shutter button or other shutter control of a camera, thereby manually capturing an image; a user setting a self-timer on a camera (e.g., by putting the camera in a self-timer mode and/or pressing a shutter button), thereby indicating that the camera should capture an image after a predetermined period of time (e.g., in fifteen seconds); a user holding down the shutter button on a camera, indicating that the camera should capture a series of images (e.g., when taking pictures of a sporting event); a user putting a camera in a burst mode, in which the camera captures a sequence of images (e.g., three) each time the user presses the shutter button; and a user putting a camera into an auto-bracketing mode, in which the camera captures a series of images using different exposure settings each time the user presses the shutter button on the camera.

In contrast, automatically capturing an image may not involve receiving any indication from a user that an image should be captured. For example, a camera consistent with some embodiments of the present invention may capture an image automatically without the user ever pressing the shutter button on the camera. Unlike capturing an image manually, capturing an image automatically may include, without limitation, one or more of the following:

(i) capturing an image without a user pressing the shutter button on the camera
(ii) capturing an image without an indication from a user
(iii) capturing an image without a direct indication from the user (iv) capturing an image without receiving an input from the user
(v) capturing an image without receiving an indication that the user would like to capture the image
(vi) capturing an image without the user's knowledge
(vii) not providing an indication to a user that an image has been captured
(viii) capturing an image without accessing information provided by a user
(ix) capturing an image based on a condition
(x) capturing an image based on a condition that was not set by a user
(xi) capturing an image while the camera is being held by a user
(xii) capturing an image independently of a user pressing a shutter button (or other type of shutter control) of the camera
(xiii) determining whether to capture an image
(xiv) determining whether to capture an image automatically According to some embodiments of the present invention, a user may or may not be aware that an image has been captured automatically. For example, a user's camera may not beep (e.g., it may be set to beep when an image is captured manually by pressing a shutter button), display an image that has been captured, or provide any other indication that it has captured an image, as is typically done by digital cameras that capture images manually. Automatically capturing an image quietly and inconspicuously may help to prevent the camera from distracting a user who is in the midst of composing a shot. For example, a user may find it annoying or distracting to have the camera automatically flash or beep when he is about to capture an important image (e.g., manually by pressing a shutter button). In a second example, capturing images without a user's knowledge may allow the camera to give the user a pleasant surprise when the user reviews his captured images and finds that the camera captured images automatically in addition to the images that he captured manually. In another example, a user may manually capture a plurality of images at a birthday party, but miss capturing an image of the birthday boy opening one of the gifts. Fortunately, the camera may have automatically captured one or more images of this special event (even though the user may not have known at the time).

In accordance with at least one embodiment of the present invention, a camera may capture an image automatically while a user is composing a shot. For example, a user may aim the camera at a subject and begin to compose a shot (e.g., adjusting the zoom on the camera, etc.). While the user is still composing the shot (i.e., before the user presses the shutter button on the camera to capture an image), the camera may capture one or more images automatically. For example, the camera may capture images of scenes that the user aims the camera at, even if the user does not press the shutter button on the camera.

Some types of cameras that capture images automatically only store such images temporarily (e.g., in volatile memory). The images are typically overwritten soon after they are stored.

Some embodiments of the present invention may include capturing an image automatically and storing this image in memory that is not non-volatile and/or not automatically overwritten. In some embodiments, an automatically-captured image may be stored in that same type of memory used to store images captured manually by a user.

In one example, an acquired image may be stored in a camera's non-volatile memory. Storing a captured image in non-volatile memory is different from storing an image in volatile memory such as an image buffer or RAM. For instance, when some types of cameras are turned off, any image that is stored in volatile memory is deleted. In accordance with one embodiment of the present invention, an automatically-captured image is stored in non-volatile memory and thus would be preserved even if the camera is turned off.

In another example, an image may be stored in a removable memory (e.g., a flash memory card). Removable memory may be larger relative to available non-removable memory of a camera. Some embodiments of the present invention provide the benefit of a camera that may acquire large numbers of images (and/or larger sized image files) automatically and store then in larger, removable storage devices. The availability of removable memory to store automatically-captured images means that the camera will not run out of available memory space as quickly as if it were restricted to storing automatically-captured images in the camera's image buffer or other non-removable memory.

Figure 13:
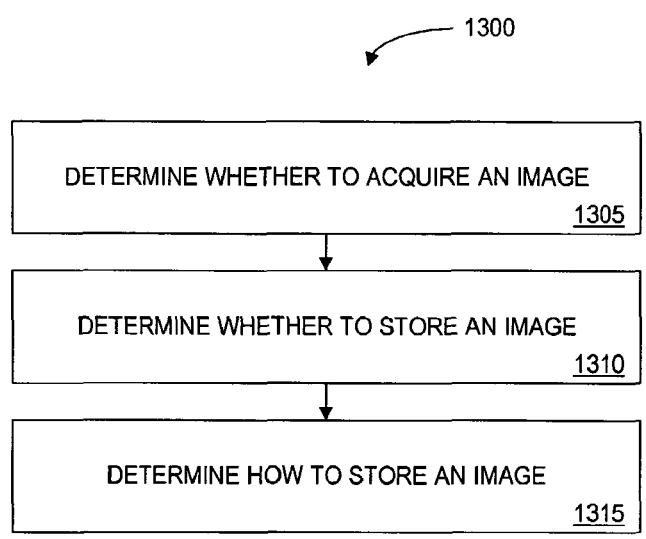
FIG. 13 is a flowchart illustrating a process consistent with at least one embodiment of the present invention.

Referring now to FIG. 13, a flowchart illustrates a process 1300 that is consistent with one or more embodiments of the present invention. For illustrative purposes only, process 1300 will be described as if a camera (e.g., camera 600) is performing all of the steps. The process 1300, and all other processes described herein unless expressly specified otherwise, may be performed by an imaging device (e.g., a camera), a computing device (e.g., a camera, a server), a storage device (e.g., a removable flash card) and/or a combination thereof (e.g., a computing device in communication with an imaging device and a storage device). Each of these devices is described in detail herein. Further, the process 1300, and all other processes described herein unless expressly specified otherwise, may include steps in addition to those expressly depicted in the Figures or described in the specification, without departing from the spirit and scope of the present invention. Similarly, the steps of process 1300 and any other process described herein, unless expressly specified otherwise, may be performed in an order other than depicted in the Figures or described in the specification, as appropriate.

Methods consistent with one or more embodiments of the present invention may include one or more of the following steps of process 1300, each of which is described in further detail herein. In other words, some embodiments of the present invention may be generally described by only one or more of the following steps. Some embodiments may comprise one or more additional and/or one or more substituted steps. Of course, the practice of any of the general steps of process 1300 may comprise various other processes or sub-steps, as discussed herein.

In step 1305, a camera determines whether to acquire an image. Various ways of determining to (or whether to) acquire an image, including based on a determination that one or more conditions are satisfied or on one or more sensors, are discussed herein. In step 1310, the camera determines whether to store an acquired image (e.g., the image acquired in step 1305). Various ways of determining to (or whether to) store an acquired image, including based on one or more ratings associated with the acquired image, are discussed herein. In step 1315, the camera determines how to store an image (e.g., the acquired image). Various ways of determining how to store an image, including based on available memory, compression conditions and/or selection conditions are discussed herein. Some embodiments of the present invention comprise at least one of the steps 1305, 1310 and 1315 and may further comprise a general step of acquiring an image (e.g., temporarily storing it in an image buffer). Some embodiments of the present invention comprise at least one of the steps 1305, 1310 and 1315 and may further comprise a general step of storing an acquired image (e.g., in non-volatile memory).

According to one illustrative embodiment consistent with the general process 1300, a camera processor (e.g., processor 605) determines to acquire an image (e.g., based on an acquire condition). An image is received by an image sensor (e.g., image sensor 665). In one example, a CCD sensor of a camera may be used to covert incident photons into electrical charges and an A2D (analog-to-digital) converter may be used to convert these electrical charges into digital information. Some types of sensors are discussed herein and others will be readily known to those skilled in the art.

The received image is temporarily stored in a buffer for processing. In one example, an image may be transferred from a CCD sensor to a captured image buffer (e.g., captured image buffer 667), where the image may be stored temporarily (e.g., while it is processed by a camera or other computing device). In one example, one or more images may be stored in the captured image buffer 667 while they are rated by the camera 650 (e.g., in accordance with instructions of a program 615). Various examples of rating images are discussed herein.

The processor determines to store the image and the image is compressed. For example, a processor 605 on the camera 600 may use a JPEG compression algorithm to generate or otherwise determine a compressed version of the image recorded in step 1505. For instance, as discussed herein, an image may be compressed based on how it is rated (e.g., lower rated images may be compressed more). The image is then stored in an image database. For example, a recorded image may be stored in non-volatile memory, image database 625 (e.g., in memory 610 or 612), an EEPROM, a CompactFlash card, or a hard disk. As discussed herein, various types of information relating to an image (e.g., a rating) may also be stored (e.g., as meta-data) in the image database or otherwise associated with a stored image. Various ways of storing an image are discussed herein.

Determining whether to acquire an image may comprise one or more of: automatically determining whether to acquire an image, determining whether an image sensor should be activated, determining whether to actuate a shutter on the camera, determining whether to acquire information from an image sensor, determining whether to store information from an image sensor, and determining whether to process information from an image sensor.

There are a variety of different ways in which a camera consistent with one or more embodiments of the present invention may determine whether to capture an image. In some embodiments, a rules-based system may be appropriate. For example, a camera may store or otherwise have access to an acquire condition database, such as the exemplary one depicted in FIG. 7. If, for example, a condition listed in the acquire condition database is true, then the camera may determine to acquire one or more image based on that condition. In some embodiments, a camera may use a neural network to analyze information received from one or more sensors on the camera (e.g., a light sensor, a microphone, and image sensor) and may automatically determine whether to acquire an image based on the analysis.

In some embodiments, one or more images may be acquired based on a condition (e.g., an acquire condition). Acquire conditions may be useful in triggering or enabling a variety of different functions, including, without limitation: determining whether to acquire an image, determining when to acquire an image, determining what image to acquire, and determining how to acquire an image.

Conditions and the performance of one or more actions based on a condition are discussed variously herein. Accordingly, it will be understood that acquiring an image based on a condition may include, without limitation: acquiring an image when a condition occurs, in response to a condition, when a condition is true, in response to a condition occurring, after a condition is true, at substantially the same time that a condition occurs, at substantially the same time that a condition becomes true, because of a condition, because a condition occurred, and because a condition is true.

Also, it will be readily understood in light of discussions herein with respect to conditions, that an acquire condition may comprise a Boolean expression and/or may be based on one or more factors. Various examples of factors upon which a condition may be based are discussed herein.

According to at least one embodiment, an acquire condition (or any other type of condition described herein) may comprise a Boolean expression. The Boolean expression, for example, may reference one or more variables or factors and may include Boolean modifiers and conjunctions (e.g., AND, OR, XOR, NOT, NAND), comparators (e.g., >, <, =, >=, <=, !=), mathematical operations (e.g., +, −, *, /, mean, standard deviation, logarithm, derivative, integral), functions (e.g., search_term_in_database( ), autocorrelation( ), dilate( ), fourier_transform( ), template_match( ), and/or constants (e.g., 10, 20 pixels, 300 milliseconds, 4 lumens, 0.02, 15%, pi, TRUE, yellow, "raining," 5200 K). Some examples of conditions comprising Boolean expressions include, without limitation:

(i) (camera_viewfinder_in_use) AND (available_memory>50 Mb)
(ii) (average_audio_noise_level>=70 dB)
(iii) (approx_camera_roll=HORIZONTAL) OR (approx_camera_roll=VERTICAL)
(iv) (peak color_intensity (image08243)<100)

A condition may be based on one or more factors. Examples of factors include, without limitation: factors affecting the occurrence of a condition, factors affecting whether a condition is true, factors causing a condition to occur, and factors causing a condition to become true. In some embodiments, at least one image may be acquired based on one or more factors.

Some general categories of factors include, without limitation: information from sensors, time-related factors, information about images stored in memory, factors relating to a state of the camera, characteristics of a user (e.g., habits, preferences), and information from a database.

Some examples of factors relating to information from sensors include, without limitation:

(i) orientation of the camera—For example, the camera may include an orientation sensor (e.g., a tilt sensor) that determines when the camera is being aimed horizontally. Based on this, the camera may automatically acquire an image, since a user of the camera may be composing a shot and the automatically acquired image may be a helpful addition to any image that may be acquired manually by the user.

(ii) a lack of movement of the camera—For example, a lack of movement (e.g., as indicated by a motion sensor) may indicate that the user is aiming the camera and/or composing a shot. In another example, if the lens cap of the camera is off and the camera is not moving, this may be an indication that a user is composing a shot with the camera. In another example, the camera may automatically acquire a plurality of images while a user is composing a shot.

(iii) motion of the camera—For example, the camera may automatically acquire a plurality of images as a user pans the camera across a scene. In some embodiments, these images may later be combined into a single panoramic image. In another example, the camera may include an accelerometer or other motion sensor that determines when a user lifts the camera (e.g., to aim the camera and/or manually capture an image).

(iv) position of the camera—According to one embodiment, the camera may capture images whenever the user is holding the camera at face-level. In another embodiment, the camera may capture images for a predetermined period of time (e.g., ten seconds) after a user raises the camera to face level.

(v) an indication that a user is using the camera's viewfinder—For example, the camera may use a proximity sensor to determine when a user is holding the camera up to his face and/or looking through the camera's optical viewfinder. If it is determined that a user is looking through the viewfinder on the camera, this may be a good indication that the user is aiming the camera at an interesting scene. In another example, the camera may have a light sensor located near the camera's viewfinder. If a user holds the camera up to his face, then this light sensor may be occluded and therefore not sense very much light (and/or sense a change in light), thus providing an indication that the camera's viewfinder may be in use. Conversely, if the light sensor senses a predetermined amount of light, then this may be an indication that the user is not holding the camera close to his face and/or is not using the viewfinder. In one embodiment, the camera may automatically acquire one or more images based on usage of the viewfinder.

(vi) an indication that a user is using the camera's viewfinder (e.g., via an image sensor)—In a third example of the camera using a sensor to determine that its viewfinder is in use, the camera may include a secondary image sensor that faces the user of the camera (e.g., an image sensor that "looks" out of the camera's optical viewfinder). This secondary image sensor may be used to determine whether or not a user is holding the camera up to his face. For example, if the secondary image sensor "sees" an image of a user's face or eye, then this may be an indication that the user is looking through the camera's viewfinder. Conversely, if the secondary image sensor does not see an image of a user's face or eye, then this may be an indication that the user is not looking through the viewfinder and may not be aiming the camera at an interesting scene.

(vii) location of the camera (e.g., determined via a GPS sensor)

(viii) ambient light (e.g., determined via a light sensor)— For example, if a light sensor on the camera determines that a user is manually capturing images in low light conditions, then the camera may automatically acquire one or more auto-bracketed images, thereby providing insurance that the user captures at least one image that is exposed correctly.

(ix) sounds and audio—For example, the camera may include a microphone. If this microphone senses an increase in the noise level, then this may be a sign that an event is occurring (e.g., a touchdown is being scored in a football game, something amusing just happened at a birthday party or wedding). Based on this increase in noise level (e.g., an condition), the camera may automatically acquire at least one image, based on the assumption (as embodied in the acquire condition) that an increased noise level may indicative of interesting images that should be captured.

(x) the range to a subject (e.g., as determined using a range sensor)—For example, the camera may determine that the subject of a scene has just moved into the focal range of the camera (a condition). Based on this, the camera may automatically acquire an image of the scene.

(xi) a touch sensor—For example, the camera may have a touch sensor that determines when the user is holding the camera. This may be useful in determining if the user is aiming the camera at a scene, and therefore may be a good condition for acquiring an image automatically.

(xii) signals from other devices (e.g., a radio beacon carried by a subject).

Examples of time-related factors may include, without limitation: the duration of a condition (e.g., for the last ten seconds, for a total of fifteen minutes), the current time of day, week, month, or year (e.g., 12:23 pm Sep. 6, 2002), a duration of time after a condition occurs (e.g., two seconds after a previous image is captured), an estimated amount of time until a condition occurs (e.g., ten minutes until the camera's batteries run out, twenty minutes before the sun goes down). For example, the camera may automatically acquire an image if a user has been aiming the camera at the same object for longer than two seconds. In a second example, the camera may automatically acquire one or more images of a scene if a user spends more than ten seconds adjusting settings on the camera before manually capturing an image of the scene. In another example, a camera may be configured (e.g., in accordance with an acquire condition) to periodically capture images as long as another condition is true. For example, the camera may capture three images per second as long as the camera is held still and the user is looking through the viewfinder of the camera. In some embodiments, such a succession of images may be captured with one or more different settings (e.g., different exposure settings, different focus settings) or auto-bracketed.

The camera may determine whether to acquire an image based on an image. For example, the camera may acquire a first image and then determine whether to acquire a second image based on this first image. For example, the camera may capture an image based on one or more of: an image that was captured manually by a user, an image that was acquired automatically by the camera (e.g., and stored in temporary memory), and one or more images stored in the camera's secondary memory (e.g., a CompactFlash card).

In one example, one or more images may be acquired based on a test or temporary image. For instance, a camera may automatically acquire a test image of a scene and determine whether the scene is interesting or not (e.g., using a scene analysis system). If the scene in the test image appears to be interesting, then the camera may acquire one or more additional images of the scene (e.g., with different exposure settings, etc). The camera may then determine whether or not to acquire at least one additional image based on the analysis of the temporary image. One method of acquiring a temporary image and using the temporary image to determine settings on a camera for capturing a second image and suitable for use with one or more embodiments of the present invention is described in U.S. Pat. No. 6,301,440.

In another example, a user may manually capture one or more images using a camera. The camera may then analyze these images (e.g., using an image analysis program) and determine whether or not to acquire addition images automatically. For example, the camera may determine that one or more images captured manually by a user are poorly exposed, blurred, or otherwise low quality. Based on this, the camera may determine to acquire at least one additional image (e.g., with different settings). For example, the camera may automatically acquire an auto-bracketed set of images of a scene based on an image that was captured manually by a user.

In another example, a camera may acquire an image based on the quality of a previously acquired image. For example, the camera may acquire a first image and then determine a rating of the first image. Based on this rating, the camera may determine whether to acquire a second image. In a more detailed example, the camera may acquire an image and rate this image as 3 out of 10 (a poorer rating) because the image is blurred. Based on this, the camera may acquire a second image. In yet another example, the camera may acquire an image and rate this image as an 8 out of 10 (a better rating) because the image shows a complex and interesting scene. Based on this, the camera may acquire additional images of the scene.

Some other factors relating to images may include: subjects (e.g., a person, a landscape, an animal), scenery (e.g., background, lighting), exposure of images (e.g., brightness, contrast, hue, saturation), framing (e.g., organization of subjects within the image), focus (e.g., sharpness, depth of field), digitization (e.g., resolution, quantization, compression), meta-information associated with an image (e.g., camera settings, identities of people in an image), and movement of subjects (e.g., a person, an animal, a vehicle).

Some examples of factors relating to habits include a user's habits when operating camera (e.g., the user forgets to take off the lens cap, the user turns the camera on and off a lot). For example, if a user tends to zoom in and out when composing a shot, then the camera may automatically acquire images while the user operating the zoom in and zoom out controls on the camera. In another example, if a user tends to spend at least fifteen seconds composing a shot, then the camera may wait ten seconds after the user starts looking through the viewfinder before it acquires any images automatically.

Some factors may relate to a user's preferences for capturing images (e.g., the user likes high contrast pictures, the user likes softening filters, the user saves images at best quality JPG compression). In one example, an acquire condition may be used to adjust the settings of the camera based on one or more of the user's preferences.

Some examples of factors relating to information stored in a database include: templates or other information useful in recognizing or processing an image, images stored in the camera's memory (e.g., a captured image database), indications by a user (e.g., the camera may automatically acquire a plurality of images if a user indicates that he is aiming the camera at an unusual or important scene), predicted weather conditions (e.g., if a user is capturing images on a beach, then the camera may automatically acquire more images during the morning if it is predicted that the weather will be overcast and rainy during the afternoon), current weather conditions, topography, vegetation, locations of landmarks, light sources (e.g., all of the lights in this building are fluorescent), anticipated events (e.g., Old Faithful may prompt the camera to automatically acquire a plurality of images when Old Faithful erupts, even if a user only captures one image manually of the geyser), the current score of a baseball game or other sports event, sunrise and sunset times (e.g., if a user is taking pictures at a picnic, then the camera may acquire more images automatically if the sun will set soon and the picnic is about to end), high and low tide times, and information about a scene.

Some examples of factors relating to the state of the camera include, without limitation: current and past settings (e.g., shutter speed, aperture, mode), parameters that affect the operation of the camera, current and past modes (e.g., "Sports" mode, "Manual" mode, "Macro" mode, "Twilight" mode, "Fluorescent Light" mode, "Silent" mode, "Portrait" mode, "Output Upon Request" mode, "Power-Save" mode), images stored in memory (e.g., total images stored, amount of memory remaining), current mode (e.g., "Sports" mode), and battery charge level. For example, the camera may determine to acquire an image automatically if a user zooms in on a subject. In a second example, the camera may determine to acquire a plurality of auto-bracketed images automatically if the user spends more than five seconds adjusting the white balance setting on the camera. In another example, the camera may acquire fewer images automatically or completely stop acquiring images automatically if the camera is running out of memory. In another example, the camera may stop acquiring images automatically if the image buffer is full. In yet another example, the camera may determine how many images to acquire automatically based on the amount of memory the camera has available. Acquiring fewer images automatically when the camera is low on primary or secondary memory may help the camera to avoid running out of memory. In another example, the camera may cease capturing images automatically if the camera's batteries begin to run low. In another example, the camera may acquire more images automatically if the camera's batteries are fully charged or if a user indicates that he has additional batteries.

In accordance with some embodiments of the present invention, a camera may determine to acquire a relatively large number of images automatically and/or may automatically acquire images relatively frequently. For example, in accordance with an example acquire condition, whenever a user holds the camera steady for at least a second, the camera may begin to acquire auto-bracketed images. For instance, the camera may automatically acquire a set of twelve auto-bracketed images while a user is composing a shot for one manually-captured image.

In another example, whenever a user is looking through the camera's viewfinder (an acquire condition), the camera may capture images semi-continuously (e.g., like a video camera). For instance, the camera may acquire images at a rate of three images per second as long as a user is looking through the viewfinder of the video camera. Note that this means the camera could acquire thirty images automatically while a user is looking through the viewfinder for ten seconds.

In another example, whenever a user presses a shutter button on the camera (a condition), the camera may capture an image of a scene (i.e., a manually-captured image). In addition, the camera may acquire one or more images automatically based on the image that was captured manually. For example, if the camera determines that the manually-captured image is under-exposed (a condition), then the camera may acquire an auto-bracketed set of images at various different exposure settings, thereby increasing the likelihood that the user captures at least one well-exposed image of the scene.

In some embodiments of the present invention, a camera may not perform a step of determining whether to acquire an image. For example, the camera may acquire images continuously or semi-continuously (e.g., like a video camera) whenever the camera is on. The camera may then determine whether or not to store the images.

As discussed above with respect to general steps 1310 and 1315, a device consistent with the present invention may make various determinations relating to the storing of an image that may have been acquired automatically. A camera may determine whether to store an image (step 1310). For example, the camera may determine whether an image should be stored in secondary memory or deleted/overwritten. A camera may determine how to store an image (step 1315). For example, a camera may determine whether an image should be compressed, and if so, how much the image should be compressed. In some embodiments, a camera may determine where (e.g., which of various available storage devices) to store an image.

A camera may determine whether to store and/or how to store an image based on one or more conditions. Such conditions may be based on one or more factors, such as those factors above with respect to acquire conditions. Some examples of determining whether and/or how to store an image that was acquired automatically include:
  (i) If a user is holding the camera still and horizontal while the image is acquired (a condition), then the image may be stored.
  (ii) If the subject of the image is more than three feet from the camera and less than ten feet from the camera (a condition), then the image may be stored and compressed by using a JPEG compression setting of 75%.

Alternatively, or in addition, a camera may determine whether to store and/or how to store an image based on the image itself. This may be done, for example, by evaluating the quality of the image or one or more characteristics of the image. For example, the camera may evaluate an image (e.g., using an image processing program) to determine the quality of the image. If the image is high quality (e.g., well-exposed, not blurred, well-framed subject), then the image may be stored by the camera in secondary memory. If the image is low quality (e.g., underexposed, blurred, or poorly composed), then the image may be compressed and stored or just deleted or overwritten.

The term "quality" is used herein in a broad sense and may be used to refer to a variety of different factors that affect whether an image is (or is likely to be) desirable to a user. The "quality" of an image may be indicative of any of various factors, some of which include, without limitation: how visually appealing the image is (e.g., pleasing, engaging), how well the image was captured or acquired (e.g., exposure, camera movement, framing, noise), how desirable the image is to the user (e.g., based on user preferences), how memorable the image may be to a user or subject, how interesting or unique the image is (e.g., capturing the exact moment of the new year in Times Square).

According to some embodiments, determining the quality of an image may include one or more of: determining one or more characteristics of the image, and determining a rating of the image.

Some examples of characteristics of an image that may be indicative of the quality of an image include, without limitation:
  (i) sharpness of the image—For example, a camera may determine if the subject of an image is in focus. In a second example, the camera may determine whether the background of the image is in focus. Images that are sharp and in focus may be determined to be of higher quality (e.g., worth storing), whereas images that are blurred, fuzzy, or out of focus may be determined to be of lower quality.
  (ii) exposure of the image—For example, the camera may determine if an image is exposed correctly. Images that are exposed correctly may be considered higher quality, whereas images that are over-exposed or under-exposed may be deemed to be of lower quality. In a second example, the camera may determine the exposure of specific portions of an image. For example, the quality of an image may depend on whether a person's face in an image is correctly exposed.

(iii) colors of the image—For example, the camera may determine a color histogram for the image and determine whether to store the image based on this. Images that have more colors or brighter colors may be more appealing to people and therefore may be considered to be higher quality. Images what are monotone, have too much contrast, or are color-saturated may be considered to be lower quality.

(iv) composition of the image—For example, the camera may determine the organization of subjects within an image and compare this to known templates of well-composed images, thereby determining if the image is well-composed. In a second example, an image of a person that does not include the person's feet may be considered to be lower quality than an image that does include the person's feet.

(v) movement in an image—For example, the camera may determine if the subject of an image is blurred by movement. Depending on the subject matter of an image (e.g., sports, running water) or a user's preferences, an image that is blurred by movement may be considered to be higher or lower quality.

(vi) subject(s) of the image—For example, the camera may use object recognition software to determine what object or objects are the subject of an image. Certain subjects may be more interesting or appealing to a user than other subjects, so images of these subjects may be considered to be of high quality. For example, images of Alice may be considered to be more valuable/higher quality than images of buildings or traffic lights. In a second example, images of the birthday girl at a birthday party may be considered to be higher quality (i.e., more important) than images of other children at the birthday party. Note that an image that is blurred or poorly exposed may be considered to be a good quality image if it captures an important subject (e.g., Barry Bonds hitting his 600th home run).

(vii) background of an image. For example, the camera may determine what landscape, scenery, building, or other objects are in the background of an image. Images in which the background of an image is visually appealing may be considered to be of higher quality.

(viii) face recognition—For example, the camera may use face recognition software to identify a person in an image (e.g., "Alice"). The camera may then save or discard an image based on the subject of the image (e.g., saving all images of Alice and deleting all images of Bob). In a second example, the camera may determine whether anybody blinked in an image of a group of people. If somebody blinked (i.e., somebody's eyes are shut in the image) or looked away (i.e., somebody is not looking at the camera), then the camera may determine that the image is lower quality.

(ix) correspondence to a user's preferences—For example, a user may indicate that he prefers images to be slightly blurred (e.g., for a softening effect in portraits). Based on this, the camera may determine images that are slightly blurred to be of higher quality than images that are very sharp. In a second example, a user may prefer that images of people have warmer colors while images of landscapes have cooler colors. Based on this preference, the camera may determine the quality of an image based on the subject matter of the image (i.e., people or landscape), the coloration of the image (i.e., warmer/redder or cooler/bluer), and the user's preferences.

(x) artificial intelligence—For example, the camera may use an artificial intelligence system (e.g., a neural net) to determine which images are most appealing to a user. In one example, the camera may determine a user's preferences based on images that the user captures using the camera. In a second example, the camera may ask a user one or more questions about his preferences (e.g., asking the user to indicate which image he prefers from a group of images), and then use the user's responses to train a neural net to determine which images are most appealing to the user.

(xi) noise—For example, the camera may determine the amount of noise in an image based on image analysis or settings of the camera when the image was captured. Images that have a large amount of digitization or quantization noise may be considered to be lower quality than images than have less noise or better digitization or quantization.

(xii) meta-data—As is known to those skilled in the art, various meta-data may be associated with an image, including information about the scene, location, time, exposure, lighting, or subject of the image. In one example, images with more meta-data or more useful meta-data may be considered by the camera to be of higher "quality" (e.g., because they are easier for a user to search and sort). For example, an image that is meta-tagged with information about the subject of the image (e.g., "Alice") as well as the location of the image (e.g., "Yosemite National Park") may be considered to be higher quality (more valuable to a user) than a similar image that has no meta-tags.

(xiii) similarity to other images—For example, the camera may compare an image that has been acquired to one or more images that have already been stored in the camera's secondary memory. If the acquired image is nearly identical to a plurality of images already stored in the camera's memory, then the camera may consider the acquired image to be lower quality than an image that is unique and different, since a user would likely be uninterested in capturing multiple images that are nearly identical to each other.

In some embodiments, determining the quality of an image may include determining one or more ratings for the image. Ratings may be determined based on a variety of different factors, including characteristics of an image that relate to the quality of an image (see above). For example, images captured by the camera may be rated on a scale of 0 to 10, with 0 corresponding to an image that should definitely be deleted and 10 corresponding to an image that should definitely be stored. Images with other ratings may be compressed based on their ratings. For example, an image that is rated a 4 may be compressed more than an image that is rated a 6.

In one embodiment, a camera may use a rating function to determine a rating for an image. A rating function may be a mathematical formula, equation, function, or process that may be used to determine a rating of an image. A rating function may reference one or more variables (i.e., factors) and may include mathematical operations (e.g. +, −, *, /, mean, standard deviation, logarithm, derivative, integral), functions (e.g., search_term_in_database( ), autocorrelation( ), dilate( ), fourier_transform( ), template_match( ), and/or constants (e.g., 10, 20 pixels, 300 milliseconds, 4 lumens, 0.02, 15%, pi, TRUE, yellow, "raining", 5200 K). Some examples of rating functions include:

(i) sharpness_of (edge_detect (image_910284))

(ii) (number_of_colors_in_image/max_possible_colors)*10

(iii) user_rating_of_person (subject_of_image (image_49325))

(iv) 100/(noise_level (image__234859))

(v) 3+sum all (meta_data (image__172498), values_of_each type_of_meta_data)

In some embodiments, an image may be assigned a plurality of ratings. For example, an image may be assigned a plurality of ratings corresponding to a plurality of different categories (e.g., categorical ratings). For instance, an image may be given an exposure rating that is indicative of how well exposed the image is, a sharpness rating indicative of how sharp the image is, and a composition rating indicative of how well composed the image is. The example image rating database shown in FIG. 9 shows one example of categorical ratings that may be applied to images.

In some embodiments, a camera may use a plurality of different rating functions to rate an image. For example, the camera may use a plurality of artificial intelligence programs or agents to rate images. Each agent may rate images differently, so an image that receives a rating of 6 out of 10 from one agent may receive a rating of 8.5 out of 10 from a second agent. In one example, each agent may select images based on different criteria. For example, a first agent may be configured to prefer (i.e., rate highly) images of groups of people, whereas a second agent may give higher ratings to images of beautiful landscapes. The ratings from the plurality of agents may approximate a user's own preferences for different types of images.

In some embodiments, an image may receive an overall rating based on one or more of a plurality of ratings (e.g., a plurality of categorical ratings). For example, the overall rating may be a simple average of the categorical ratings, as depicted in FIG. 9. Of course, an overall rating for an image may be determined in a variety of other ways as well. For example, the overall rating of an image may be determined as the weighted average of the image's categorical ratings (e.g., exposure may be weighted more than subject).

It will be readily understood that ratings of images may be expressed in a quantitative format. For example, a quantitative rating for an image may be expressed as: 76 out of the range [0, 100], 45.3 out of the range [0, 60], −0.4 out of the range [−1, 1] or 213 on a scale that starts at 0 and has no upper limit. Ratings may not be bounded, may include negative numbers, and may, of course, include numbers other than whole integers, as deemed appropriate for a particular application.

Of course, ratings may be expressed qualitatively. Qualitative ratings, for example, may be especially useful because they may provide more descriptive information (e.g., about what is good or bad about an image). Some examples of qualitative ratings include:

(i) "excellent", "good", "fair", "mediocre", "horrible"

(ii) "over-exposed", "under-exposed", "correctly exposed"

(iii) "extra-sharp", "sharp", "slightly blurred", "very blurred"

(iv) "face(s) blocked", "face(s) easy to see", "face(s) difficult to see"

(v) "artistic", "snapshot"

(vi) "lots of useful meta-data", "some useful meta-data", "no meta-data/useless meta-data"

(vii) "Subject: Alice", "Subject: Bob", "Subjects: Alice and Bob"

In some embodiments, images may be rated relative to other images (e.g., graded on a curve). For example, an image of average quality may receive a rating of 0, an image of above average quality may receive a rating of +3.2, and an image of below average quality may receive a rating of −2.7. Images may be rated relative to any other group of images, including:

(i) other images of the same scene—For example, a camera may rate all pictures of Alice relative to each other to determine which is the best picture of Alice. In a second example, the camera may rate each of the images in an auto-bracketed set relative to each other.

(ii) other images captured by the camera during a specified time period (e.g., during the last five minutes, since the camera was turned on).

(iii) other images stored in a camera's secondary, removable or non-volatile memory—For example, an image may be rated relative to other images stored on the camera's flash memory card.

(iv) other images in a certain category—For example, an image of Alice may be rated relative to other images of Alice. In a second example, an image of a sunset over a beach may be rated relative to other images of sunrises and sunsets, or alternatively relative to other images of beaches.

(v) similar images—For example, the camera may compare an image that has been acquired to one or more images that have already been stored in the camera's secondary memory. If the acquired image is nearly identical to a plurality of images already stored in the camera's memory, then the camera may give the image a low rating, since a user would likely be uninterested in capturing multiple images that are nearly identical to each other.

One or more images may be rated as a group and receive a group rating. For example, the camera may acquire a set of auto-bracketed images and determine a rating for this entire set of images. The camera may then store the images, for example, based on the group rating.

As discussed above, an imaging device in accordance with some embodiments of the present invention may determine whether to store an image based on the quality of the image. In some embodiments, an imaging device may determine whether and/or how to compress (or delete) an image based on a quality of the image. For example, images that receive ratings of higher than a threshold value may be stored in the camera's secondary memory. In another example, an image that receives a rating of 8/10 may be compressed using a JPEG compression setting of 60%. In another example, an image that receives a rating of less than a threshold value may be deleted from the camera's memory.

As discussed herein, storing an image may include one or more of: storing the image in secondary memory, storing the image in non-volatile memory, storing the image in removable memory, transferring the image from primary memory to secondary memory, transferring the image from volatile memory to non-volatile memory, transferring the image from non-removable memory to removable memory, and compressing the image.

It will be readily understood that images may be deleted in a variety of different ways. For example, deleting an image may include: deleting the image from memory, deleting the image from primary memory, deleting the image from secondary memory, overwriting the image in memory, marking the image as deleted and/or marking the image to be overwritten.

In accordance with some embodiments of the present invention, storing an image based on the quality of the image may include one or more of: storing the image based on a rating of the image, automatically determining whether to store the image, determining whether to store the image based on the quality of the image, determining whether to store the image based on a rating of the image, automatically determining how to store the image, determining how to store the image based on the quality of the image, and determining how to store the image based on a rating of the image.

In accordance with some embodiments of the present invention, deleting an image based on the quality of the image may include one or more of: deleting the image based on a rating of the image, determining whether to delete the image based on the quality of the image, and determining whether to delete the image based on a rating of the image.

Some embodiments of the present invention provide for compressing an image based on the quality of the image. Compressing an image based on the quality of the image may include one or more of: compressing the image based on a rating of the image, determining how much to compress the image, determining how much to compress a file that stores the image, determining whether to compress the image, determining whether to compress a file that stores the image, determining a compression setting for compressing the image, and automatically adjusting a compression setting for compressing the image.

In one example of processing an image based on a rating of the image, a camera may compare a rating of an image to a threshold value (e.g., to determine if the rating is better or worse than the threshold value). This threshold value may be predetermined or may be determined based on one or more other factors. Such threshold values may be expressed as conditions (e.g., as a compression condition in compression condition database 440 or 640).

For example, a camera may store any image that receives a rating of 5.0 or higher. Thus, an image that receives an overall rating of 6.8 may be saved, whereas an image that receives an overall rating of 4.2 may be deleted. In another example, a camera may determine a threshold value based on one or more stored images. For example, the camera may determine the average rating of one or more stored images. A new image acquired by the camera may only be saved if the rating of the new image is greater than the average rating of the stored images.

In some embodiments, a camera may determine how much to compress an image based on a rating of the image (e.g., an image's overall rating, an exposure rating of an image). For clarity, the following examples describe affecting the compression of an image by adjusting a compression setting for an image compression program (e.g., a JPEG image compression program). It should be understood by those skilled in the art that the camera may affect how much an image is compressed in a variety of other ways as well.

In one example, an image may be compressed based on a mathematical function of its rating. For example, the camera may adjust the compression setting for a JPEG compression program to be: compression_setting=10+(9*image_rating). Thus, an image with a rating of 6.3 might be compressed with a compression setting of 67%. Note that a wide variety of mathematical functions are know to those skilled in the art and need not be described in detail herein.

In another example, a rating of an image may be compared to a threshold value (e.g., a predetermined threshold value, a rating of another image). For example, the camera may compress any image that receives a rating of 7.0 or lower. Thus, an image that receives a rating of 6.3 may be compressed, whereas an image that receives a rating of 7.5 may not be compressed or may be compressed by a lesser amount.

In another example, an image may be compressed based on a condition relating to a rating of the image. For example, the camera may store a database that includes the following exemplary rules:

(i) if (image_rating<2) then (compression_setting=30%)
(ii) if (2<=image_rating<5) then (compression_setting=50%)
(iii) if (5<=image_rating<8) then (compession_setting=80%)
(iv) if (8<image_rating) then (compression_setting=100%)

In some embodiments, an image may be stored, deleted, or compressed based on a categorical rating of the image. For example, an image may be compressed with a compression setting equal to: compression_setting=30+70*(image_sharpness_rating). In another example, a categorical rating of an image may be compared to a threshold value. For example, an image may be deleted if its sharpness rating is less than 3 out of 10.

In some embodiments, an image may be stored, deleted, or compressed based on a plurality of ratings of the image. For example, an image may be compressed based on a plurality of ratings of the image. For example, an image may be compressed with a compression setting of 80% if the image received an exposure rating of better than 7 and a sharpness rating of better than 8. If the image's exposure rating is better than 7 but the image's sharpness rating is worse than 8, then the image may be compressed with a compression setting of 60%. In another example, a plurality of ratings of an image may be compared to one or more threshold values. For example, an image may be stored if its sharpness rating is greater than 3 out of 10, its exposure rating is greater than 2 out of 10, and its subject relevancy rating is greater than 4 out of 10.

In some embodiments, an image may be stored, deleted, or compressed based on a categorization of the image. For example, different types of images may be compressed based on different compression settings. For example, an image of a landscape that receives an 8 rating may be compressed with a compression setting of 80%, whereas a portrait that receives an 8 rating may be compressed with a compression setting of 90%. Varying the amount of compression for different types of images may be particularly appropriate if a user is interested in storing certain images at higher quality than other images. In another example, different types of images may be compared to different threshold values. For example, images that belong in a first category (e.g., pictures of Alice) may be compared to a first threshold value (e.g., 4.5), whereas images that belong in a second category (e.g., pictures of Bob) may be compared to a second threshold value (e.g., 5.3). Therefore, an image of Alice that receives an overall rating of 5.0 may be saved, whereas an image of Bob that receives the same rating may be discarded. Comparing different types of images to different threshold values may be particularly appropriate if a user would prefer to capture images of a certain type.

In some embodiments, an image may be stored, deleted, or compressed based on one or more other images. For example, a camera may compare the ratings of two or more images. For example, two images of a waterfall may be acquired by the camera (e.g., as part of an auto-bracketed set). The camera may rate the two images and then compare the ratings of the two images. Based on this comparison, the camera may save the better image of the two and delete the worse image of the two. In another example, a camera may determine how much to compress an image based on one or more stored images. For example, the camera may determine the average rating of one or more stored images and the amount of memory. A new image acquired by the camera may be compressed according to the formula: compression_setting=70+3*(new_image_rating−average_image_rating). In another example, a camera may compare the ratings of four images and sort the images based on their ratings. The best image may be not be compressed at all, the second best image may be compressed with a compression setting of 80%, and the remaining two images may be compressed with a compression setting of 50%. In another example, the camera may acquire an image of Alice and rate this image as 6 out of 10. However, since the camera already has twelve images of Alice that have ratings of 8 out of 10 or higher, the new image of Alice (the one rated 6 out of 10) may be deleted.

Storing, compressing, and/or deleting an image may also be performed based on a variety of other factors, including one or more of:
  (i) indications from a user—For example, a user may indicate that all images of Alice should be compressed with a compression setting of 85%. In a second example, a user may indicate the camera should only store the best image from any auto-bracketed set. In a third example, images that are captured automatically within 10 seconds of a user pressing the shutter button on the camera may automatically be stored.
  (ii) habits or preferences of a user—For example, a user may indicate that he prefers images of people to images of landscapes. Based on this, the camera may set a higher threshold rating for storing images of landscapes and a lower threshold rating for storing images of people.
  (iii) state of the camera—For example, the camera may compress acquired images by a greater amount if it is running out of space in memory. In a second example, the camera may not bother compressing images if it is about to run out of batteries and it has a large amount of unused secondary memory. See below for further examples of storing, deleting, or compressing an image based on an amount of space that the camera has available in memory.
  (iv) capture conditions—For example, images that are captured based on the user holding the camera steady may be compressed with a compression setting of 80%, while images that are captured based on sounds recorded by a microphone may be compressed with a compression setting of 60%.

In some embodiments, an image may be stored, deleted, or compressed based on an amount of memory that is available to the camera. For example, the camera may determine whether to store or delete an image based on the quality of the image and the amount of memory space available. For example, an automatically-captured image may be stored by the camera if the image receives a rating of greater than 6 out of 10 and the camera has at least 16 Mb of secondary memory free. If the camera has only 10 Mb of memory free, then an image may need to have a rating of better than 8 out of 10 in order to be stored and not deleted.

In another example, a camera may determine how much to compress an image based on how much memory the camera has free and the quality of the image. For example, the camera may compress images according to the formula: compression_setting=50*(free_memory/total_memory)+5*image_rating. Images may be compressed by a greater amount if the camera is running low on memory.

Optionally, an image (including images captured automatically) may be meta-tagged. Meta-tagging is used to refer to the general process of associating supplementary information with an image that is captured by an imaging device. The supplementary information associated with an image may be referred to as meta-data (or a "meta-tag"). Meta-data associated with an image may be stored in the same file as an image (e.g., a TIFF image file), or in an associated file (e.g., an image rating database). Examples of meta-data that may be stored with an automatically-captured image may include, without limitation:
  (i) at least one rating of the image—For example, the camera may rate an image as 7.8 out of 10. This rating may be stored as meta-data in a file along with the image. In a second example, the camera may determine a plurality of ratings of the image (e.g., in different categories, or by different agents) and store one or more of this plurality of ratings as meta-data associated with the image.
  (ii) an indication of why the image was captured—For example, the camera may store an indication of a capture condition that caused an image to be captured. Examples of reasons that the camera may capture an image include capture conditions, and indications by a user (e.g., a user pressing the shutter button on the camera).
  (iii) other meta-data—A variety of other types of meta-data are known to those skilled in the art, including: time and date (when an image was captured), camera settings (e.g., what aperture, shutter speed were used to capture the image, auto-bracketing settings), position (e.g., GPS coordinates where the image was captured), orientation (e.g., of the camera), image content (e.g., subjects), categorization, scene data (blue sky/water/grass/faces, illumination), subject motion, sound annotations, preferred cropping, and scale.

Associating meta-data with an image may be helpful for a variety of different processes and applications, including sorting of images, display of images, and compression/deletion of images. For example, images may be ordered according to their ratings (e.g., highest quality images first), or stored in folders based on content or quality (e.g., a first folder for high quality image of Alice, a second folder for medium-quality images of Alice, and a third folder for high quality images of Bob). In another example, it may be helpful to display meta-data to a user when displaying a stored image to a user. For instance, information about when, how, and why an image was captured may be displayed as text in a sidebar next to a displayed image. Note that images may be displayed using a variety of different devices, including the camera, a personal computer, or a digital picture frame. In another example, a camera may compress or delete one or more images if it is running low on memory space. For example, the camera may compress all images that have ratings worse than 5 out of 10, while leaving all images with higher ratings uncompressed.

Figure 14:
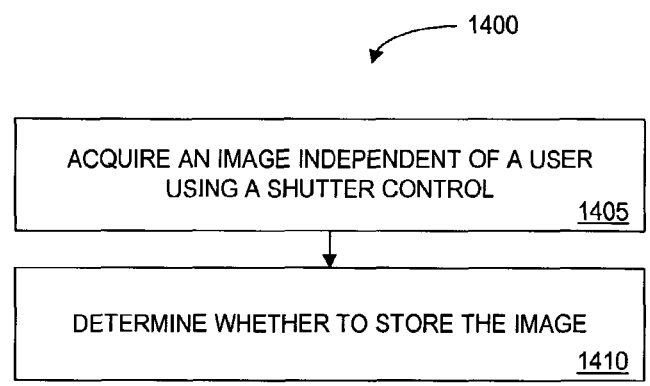
FIG. 14 is a flowchart illustrating a process for acquiring an image automatically that is consistent with at least one embodiment of the present invention.

Referring now to FIG. 14, a flowchart illustrates a process 1400 that is consistent with one or more embodiments of the present invention. The process 1400 is a method for acquiring one or more images. For illustrative purposes only, the process 1400 is described as being performed by a camera (e.g., camera 210). Of course, the process 1400 may be performed by any type of imaging device 110, or an imaging device 110 in conjunction with a computing device 120, for example.

In step 1405, a camera acquires an image independent of (or absent) a user's operation of a shutter control (e.g., a shutter button). In one example, the camera acquires an image of a scene automatically, but not in response (either directly or indirectly) to a user pressing a shutter button of the camera.

It will be understood that many types of cameras require a user to use a shutter control to initiate the taking of pictures in an auto-bracketed mode, a burst mode, or a self-timer mode. For example, a self-timer mode of a typical camera requires a user to press a shutter button. The pressing of the shutter button initiates a countdown of a predetermined time period, and the camera takes a picture at the end of the predetermined period of time. In contrast, in step 1405 the acquiring of an image by the camera is absent such use of a shutter control by a user. For example, the camera may acquire an image based on one or more acquire conditions, as discussed further herein. In some embodiments, a plurality of images may be acquired independent of (or absent) a user's use of a shutter control.

In step 1410, the camera determines whether to store the acquired image. Various ways of determining whether to store an acquired image are discussed herein.

Figure 15:
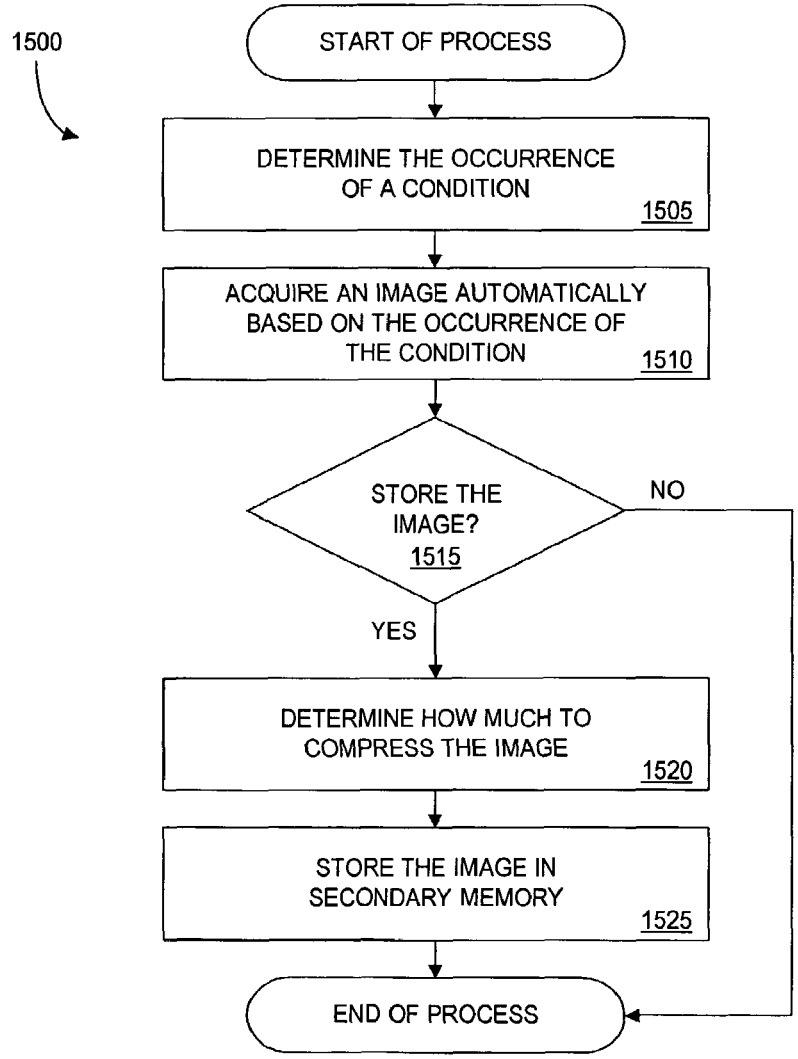
FIG. 15 is a flowchart illustrating a process consistent with at least one embodiment of the present invention.

Referring now to FIG. 15, a flowchart illustrates a process 1500 that is consistent with one or more embodiments of the present invention. The process 1500 is a method for acquiring an image automatically. For illustrative purposes only, the process 1500 is described as being performed by a camera (e.g., camera 210).

In step 1505, a camera determines the occurrence of a condition. For example, the camera determines that the acquire condition 705 "AC-47532524-01" in the acquire condition database 620 has occurred (e.g., information from a proximity sensor indicates that the camera viewfinder is in use). In step 1510, the camera acquires an image automatically based on the occurrence of the condition. For example, the camera may hold an image in an image buffer for additional processing. In step 1515, the camera determines whether to store the image. Various ways of determine whether to store an image are described herein. For example, the camera may rate the image based on one or more characteristics and/or an amount of available memory. If it is determined not to store the image, the process 1500 ends. Otherwise, in step 1520, the camera determines how much to compress the acquired image, as discussed herein. In step 1525, the camera stores the image (compressed or uncompressed) in a secondary memory, such as an external hard drive, Web server, or flash memory card, and the process 1500 ends. Preferably, the secondary memory is non-volatile.

In accordance with some embodiments, a camera may perform a process of managing one or more automatically-captured images. For example, a camera may automatically compress or delete one or more images in order to free up memory on the camera.

A general process in accordance with one or more embodiments of the present invention may include one or more of the following steps: determining whether to compress or delete at least one image stored in memory, determining which image(s) to compress or delete, determining how much to compress an image, and compressing or deleting at least one image stored in memory.

As noted above, in one embodiment compressing or deleting an image may be performed automatically (e.g., by a camera processor). Automatically compressing or deleting an image may include one or more of the situations: a user may not provide an indication that an image should be deleted or compressed, a user may not be aware that the camera has deleted or compressed at least one image, a user may not request that the camera delete or compress at least one image, one or more images may be deleted or compressed without interaction by a user, the camera may determine whether to compress or delete at least one image without assistance from a user, the camera may determine which image(s) to compress or delete without assistance from a user, the camera may determine how much to compress at least one image without assistance from a user, and the camera may compress or delete at least one image without assistance from a user.

In some embodiments, a camera may automatically compress or delete manually-captured images (e.g., images captured in direct response to a user pressing the shutter button). For example, a camera may determine that an image a user captured is of poor quality and then automatically delete or compress the image (e.g., without the user's express permission). Some types of users (e.g., photographers who typically capture large numbers of images) may find it helpful to have the camera automatically manage a set of manually-captured images.

In accordance with one or more embodiments, a camera may determine to compress or delete at least one image stored in memory based on a condition (e.g., a compression condition). For example, if a camera is running out of secondary memory (e.g., a Compact Flash card), the camera may determine that one or more images stored in secondary memory should be compressed or deleted to free up memory space and make room for additional images.

In addition to other factors discussed herein, some examples of factors that may be used by a camera to determine whether to compress or delete an image include, without limitation: factors relating to the camera's memory usage, factors relating to capturing images, indications by a user, and factors relating to images stored in memory.

Some examples of factors relating to the camera's memory usage include:
  (i) an amount of memory that is free—For example, the camera may determine that it needs to free up some memory (e.g., by compressing or deleting images) if it has less than 5 Mb of secondary memory available.
  (ii) an amount of memory that is used—For example, the camera may determine that one or more images should be compressed because more than 200 Mb of the camera's 256 Mb Flash memory card has been used.
  (iii) a ratio or percentage of memory that is used—For example, the camera may decide to compress one or more images if more than 75% of its total memory is used.
  (iv) an amount of memory occupied by an image—For example, the camera may automatically delete or compress an image if the image occupies more than 1 Mb of memory.
  (v) an amount of memory occupied by a group of images—For example, the camera may allocate 50 Mb of memory for automatically-captured images of Alice. Some images of Alice may be compressed or deleted if the total amount of memory used for images of Alice is greater than 50 Mb.
  (vi) an amount of memory occupied by automatically-captured images—For example, the camera may determine to compress or delete one or more automatically-captured images if automatically-captured images take up more than 20% of the camera's memory and the camera has less than 5 Mb of memory remaining.
  (vii) an amount of space that an image occupies in primary memory—For example, the camera may acquire one or more images and store these images in an image buffer. However, the camera's secondary memory (e.g., a flash memory card) may be mostly or completely full, meaning that there is no space in secondary memory for the newly acquired images to be stored. The camera may then compress or delete one or more images from secondary memory in order to make space for the newly acquired images. That is, the camera may automatically compress or delete one or more images if the amount of space taken up by images in primary memory is greater than the amount of space available in secondary memory. This in turn may enable the camera to transfer one or more images from primary memory (e.g., an image buffer) to secondary memory (e.g., a flash memory card).

(viii) a number of images stored in memory—For example, the camera may limit the total number of automatically-captured images that may be stored in memory. For example, if the camera limits the number of automatically-captured images to 100 and the camera has already stored 100 images, then it may determine that it should delete one or more images to make room for future automatically-captured images.

It will be understood that an amount of memory may be measured in a variety of different ways, including bits, bytes, blocks, disk area, a number of images, a number of files, a percentage of memory, or a ratio of memory.

Some examples of factors relating to capturing images include, without limitation:

(i) the camera captures an image manually—For example, the camera may determine to automatically compress or delete one or more images to make room for a manually-captured image.

(ii) the camera captures an image automatically—For example, the camera acquires an image automatically and determines a rating for this image. The rating of this image may then be compared with the ratings of one or more automatically-captured images stored in memory (e.g., secondary memory). If the rating of the newly-acquired image is better than a rating of one of the automatically-captured images stored in memory, then the camera may delete or compress the automatically-captured image stored in memory.

(iii) images stored in an image buffer after being acquired—For example, the camera may automatically compress or delete one or more automatically-captured images if the amount of memory required for images stored in the image buffer is greater than the amount of secondary memory that is unused.

Some examples of indications by a user include, without limitation:

(i) manually capturing an image—For example, a user may press the shutter button on the camera to indicate that he would like to manually capture an image. In order to make space for the manually-captured image, the camera may compress or delete one or more automatically-captured images.

(ii) operating controls on the camera—For example, a user may press a button on the camera to indicate that he would like the camera to automatically compress or delete one or more images. See Section 6.1 for details about controls on the camera.

(iii) settings on the camera—For example, the camera may include a setting that allows a user to specify the maximum amount of memory on the camera that can be taken up by automatically-captured images.

Some examples of factors relating to images stored in memory include:

(i) subjects of one or more images stored in memory—For example, the camera may group images together based on their subjects or categories (e.g., images of Alice, images of beaches). If the total amount of memory occupied by automatically-captured images of beaches is greater than 10% of secondary memory, then the camera may determine to compress or delete one or more images of beaches.

(ii) the quality of one or more images stored in memory (e.g., ratings)—For example, the camera may determine that one or more automatically-captured images should be compressed if 95% of the camera's memory is full and the images have ratings of less than a threshold value.

As discussed herein, one example of a condition is a comparison between an amount of memory and a threshold value. That is, the camera may determine to compress or delete at least one image based on how an amount of memory compares to a threshold value. For example, one or more images may be compressed if the total amount of free memory in a CompactFlash card is less than 10 Mb. Similarly, multiple amounts of memory may be compared to multiple threshold values as part of a condition. A threshold value may be predetermined or may be determined based on one or more other factors. Some examples of conditions of this type include:

(i) (percentage_of_memory_occupied>=75%)
(ii) (free_memory<20 Mb)
(iii) ((total_memory AC_images−memory_used_AC_images)<15 Mb)
(iv) (free_memory<20 Mb) and (percentage_of_memory_AC_images>50%)
(v) (memory_used (image_buffer)>=memory_available (secondary_memory))

The exemplary compression condition database depicted in FIG. 11 gives one example of how the camera may determine whether to compress or delete one or more images based on a compression condition. For example, whenever any of the compression conditions 1105 are true, then the camera may determine that it should compress or delete at least one image.

According to some embodiments, a camera may also determine which images to compress or delete. This process may include selecting one or more images from the images stored in the camera's memory. For example, after the camera determines that one or more images should be compressed or deleted, the camera may select which images should be compressed or deleted.

For example, a camera may select a single image to compress or delete. For instance, the camera may determine to compress a poorly exposed image of Alice next to a campfire. In another example, a camera may select a plurality of images to compress. For instance, the camera may automatically compress all images that have been captured in the last 15 minutes. In another example, a camera may select a plurality of images to delete. For instance, the camera may automatically delete all images that have ratings of worse than 1.2. In another example, a camera may select at least one image to compress and at least one image to delete. For instance, the camera may automatically compress all images that have ratings of worse than 5.3 but better than 1.2 and delete all images that have ratings worse than 1.2.

In some embodiments, an imaging device may determine one or more images to compress or delete based on a condition (e.g., selection condition 1110). For example, the camera may determine to compress or delete images for which the following exemplary conditions are true:

(i) (overall_rating_of_image<1.2)
(ii) (reason_for_capturing_image!=MANUALLY_CAPTURED_IMAGE)
(iii) (rating_of_image<4) AND (compressibility_of_image (0.1_setting)>20%)
(iv) (image_captured_automatically) AND (correlation (image, any_manually_captured_image)>0.9)

Some examples of factors that may be considered when determining which image(s) to compress or delete include, without limitation:

(i) the quality of at least one image
(ii) the compressibility of at least one image (iii) meta-data associated with at least one image (e.g., time, location, subject, associated images)
(iv) image content
(v) an amount of memory
(vi) a user's preferences Some examples of selecting one or more images to compress or delete based on the quality of at least one image include, without limitation:
  (i) The camera may compress one or more low quality images, but leave one or more higher quality images uncompressed. For example, the camera may compress images with ratings less than a threshold value. Note that a threshold value may be predetermined or may be determined based on one or more other factors.
  (ii) The camera may determine a rating for an image and determine whether the image should be compressed or deleted based on this rating. For example, after the camera determines that one or more images should be compressed or deleted, the camera may determine a rating for each image stored in memory. All images with ratings of less than 5 may then be compressed.
  (iii) The camera may determine ratings of a plurality of images. Based on the plurality of ratings, the camera may select one or more images to be compressed or deleted. For example, the camera may determine ratings for a plurality of images and then rank the images according to their ratings. The three images with the lowest ratings may then be deleted.
  (iv) The camera may store an indication of the quality of an image (e.g., a rating) as meta-data associated with the image. When it comes time to compress or delete one or more images (e.g., based on a compression condition 1105), the camera may retrieve this stored indication of the quality of the image and use it to determine whether an image should be compressed or deleted.

As mentioned above, a camera consistent with some embodiments may determine at least one image to compress or delete based on the compressibility of one or more images (i.e., how much one or more images may be compressed). Note that compressibility may be measured in a variety of different ways, including:
  (i) an amount of memory that would be vacated by compressing an image—For example, compressing a first image may free up 100 kb of memory on the camera, whereas compressing a second image may free up 200 kb of memory. Based on this, the camera may determine to compress the second image rather than the first image, thereby freeing up more memory on the camera.
  (ii) an amount of memory that would be occupied by a compressed image—For example, compressing a first image with a JPEG compression setting of 80% may result in a file size of 892 kb, whereas compressing a second image with a JPEG compression setting of 80% may result in a file size of 763 kb. Based on this, the camera may determine to compress the second image and not the first image. Note that in some cases it may be necessary to create a compressed version of an image in order to determine the file size of the compressed image.
  (iii) a compression setting necessary to achieve a desired amount of compression—For example, 10% of the information in a first image may need to be discarded by a compression program in order to reduce the file size of the image by 200 kb. In contrast, only 5% of the information in a second image may need to be discarded by a compression program in order to reduce the second image by 200 kb. Based on this, the camera may compress the second image instead of the first image, thereby reducing the amount of information that needs to be discarded in order to free up a given amount of memory.
  (iv) an amount of compression achievable with a particular compression setting—For example, compressing a first image using a JPEG compression setting of 75% may result in a 30% reduction in the file size of the first image, whereas compression compressing a second image using a JPEG compression setting of 75% may result in a 30% reduction in the file size of the second image.
  (v) an amount of compressibility of a plurality of images— For example, the camera may compress one or more images as a group (e.g., based on similarities between the images). For example, the camera may determine whether to compress a group of auto-bracketed images based on how much the entire group of images may be compressed.

In one example, selecting one or more images to compress or delete based on meta-data associated with at least one image, each time a camera automatically captures an image, the camera may determine a rating for the image and store the rating of the image as meta-data associated with the image. If, at a later time, the camera determines that one or more images should be compressed or deleted, then the camera may retrieve the rating associated with the image and determine whether the image should be compressed or deleted based on this rating.

In another example, a camera may store information about how or when an image is captured as meta-data associated with the image. In response to the determination that one or more images should be compressed, the camera may select images based on this meta-data (e.g., all images that were captured using a flash may be compressed).

In another example, information about the subject of an image (e.g., determined by the camera, or supplied by a user) may be stored as meta-data associated with the image. A camera may compress or delete images based on their subjects. For example, the camera may automatically compress all images stored in memory except for those images that include Alice. In yet another example, meta-data associated with an image may indicate whether the image has been compressed before, and if so, how much the image was compressed. In one example, a camera may refrain from compressing images that have been compressed before.

Some examples of selecting one or more images to compress or delete based on image content include:
  (i) The camera may use an image analysis program to analyze one or more images stored in memory to determine which of these images should be compressed or deleted and which of these images should remain unaltered.
  (ii) The camera may analyze the images stored in memory to determine which images are overexposed, which are underexposed, and which are correctly exposed. Overexposed or underexposed images may be compressed or deleted.
  (iii) The camera may use image recognition software to determine the subjects of one or more images stored in memory and then compress or delete images based on the subjects of images. For example, the camera may analyze one or more image to determine which images are close-ups of people. The camera may then compress all images that are not close-ups of people.
  (iv) The camera may select images to compress or delete so that it maintains at least one high quality image of each subject. For example, before compressing any images, the camera may store three images of Alice, two images of Bob, and one image of Carly. Based on this, the camera may choose to compress two images of Alice and one image of Bob, leaving one image of Alice, one image of Bob, and one image of Carly unaltered.

(v) Images that were captured as a group may be compressed as a group. For example, the camera may automatically capture an auto-bracketed set of images (e.g., all images of the same scene). If the camera later determines that one or more automatically-captured images need to be compressed, then each image in the set of auto-bracketed images may be compressed.

As mentioned earlier, a camera may select one or more images to be compressed or deleted based on an amount of memory. For example, a camera may determine that 25 Mb of memory should be vacated to make room for images that may be captured by the camera in the future (e.g., because the camera needs this space to store one or more manually-captured images). Based on this, the camera may select an appropriate combination of automatically-captured images that take up at least 25 Mb of memory and delete these images. Other examples of factors relating to an amount of memory include: an amount of memory that should be vacated, an amount of memory that is occupied by one or more images, an amount of memory needed to store one or more images, an amount of memory that is free, an amount of memory that would be occupied by a compressed image, and an amount of memory that would be vacated by compressing an image.

As discussed herein, in some embodiments, a user's preferences or indications from a user may affect which images are compressed or deleted. For example, a user may indicate that he prefers images of a certain type. Based on this preference, the camera may determine to compress or delete certain images but leave other images unaltered. For example, a user may indicate that he is most interested in saving images of groups of people. Based on this, the camera may compress any automatically-captured images that do not include groups of people.

In another example, a camera may use an artificial intelligence program to determine a user's preferences (e.g., by tracking which images a user captures manually and which images the user chooses to delete). For example, the camera may determine that a user dislikes images that have busy or complicated backgrounds. Based on this, the camera may compress or delete one or more images that have busy or complicated backgrounds.

In another example, a user may indicate that he plans on capturing one or more images of a certain type. The camera may select one or more images to compress or delete based on this indication. For example a user may indicate that he plans on capturing a plurality of images of Alice. Based on this, the camera may reduce the number of images of Bob stored in memory to make room for the images of Alice that the user anticipates capturing.

In another example, a camera may offer the user a choice of which images should be compressed or deleted. For example, the camera may prompt a user, "Do you want to compress the images of Alice, the images of Bob, or the images with the lowest ratings?" If the user responds that he would like to compress the images of Bob, then the camera may compress the images of Bob based on the user's response. In yet another example, a camera may display an image to a user and prompt the user to indicate whether the image should be compressed.

The example compression condition database 440 depicted in FIG. 11 shows one example of how the camera may determine one or more images to compress or delete. According to this example, the camera determines whether it should compress or delete images based on a compression condition 1105 and then determines which images to compress of delete based on a selection condition 1110. For example, if the amount of free memory on the camera is less than 10 MB (a compression condition), then the camera may select all automatically-captured images with ratings of less than 7.0 to be compressed. In some embodiments, however, the camera may not determine which images to compress or delete. For example, the camera may automatically compress all images stored in memory or all automatically-captured images stored in the camera's secondary memory.

In some embodiments, a camera may determine how much to compress one or more images. This may include determining an amount of compression. For example, the camera may determine whether an image should be compressed to 75% of its original size or 80% of its original size. Note that an amount of compression may be measured in a variety of different ways, including: a compression setting to use when compressing one or more images, an amount of memory to free, and an amount of memory to be occupied by one or more images.

As mentioned above, the camera may determine a compression setting (e.g., compression setting 1115) that controls how much one or more images are compressed. For example, the camera may determine whether an image should be compressed with a JPEG compression setting of 60% or a JPEG compression setting of 80%. Note that a compression setting may affect how much an image is compressed by an image compression program.

As mentioned above, the camera may determine an amount of memory to free. Note that "freeing" memory may include removing data from the memory (e.g., at least a portion of an image file), marking the memory as vacant, reformatting the memory, or otherwise making the memory available to store other data. Examples of the camera determining an amount of memory to free include:

(i) The camera may determine that 25 Mb of memory should be freed to make room for images that may be captured by the camera in the future.

(ii) The camera may determine that the file size of an image should be reduced by 300 kb.

(iii) The camera may determine to delete 4 images, each of which occupies 900 kb.

(iv) The camera may determine that a group of images (e.g., an auto-bracketed set of images of Bob with his car) should be compressed enough to free up 1200 kb of memory.

As mentioned above, a camera may determine an amount of memory to be occupied by one or more images. For example, the camera may determine that an image should be compressed so that its file size is approximately 500 kb. In another example, the camera may determine that a group of images (e.g., an auto-bracketed set of images of the Statue of Liberty) should occupy no more than 10 Mb. In another example, the camera may determine that a group of images (e.g., images of Alice on the beach) should occupy 10% of the camera's total memory. In another example, the camera may determine that a first image should be compressed so that it takes up ½ of the amount of memory that is occupied by a second image.

In some embodiments, a camera may determine a desired amount of compression, and determine how much to compress a plurality of images based on this desired amount of compression. A desired amount of compression may be a total amount of compression for a plurality of images. For example, the camera may determine that 40 Mb of memory should be freed by compressing a plurality of images. Based on this desired amount of compression, the camera may determine how much to compress a plurality of images. Some examples include:
   (i) The camera may compress a plurality of images so that the total amount of memory freed by compressing the images is approximately equal to the desired amount of memory to be freed. Note that the total amount of memory freed by compressing the images may be determined by summing the amount of memory vacated by compressing the first image plus the amount of memory vacated by compressing the second image, etc.
   (ii) The camera may compress a plurality of images so that the total amount of memory freed by compressing the images is greater than or equal to the desired amount of memory to be freed.

In one example, the compression tracking database 645 depicted in FIG. 12 shows how a camera may compress a plurality of images stored in the camera's memory, thereby freeing up a desired amount of memory.

In some embodiments, a camera may determine how much to compress at least one image based on a variety of different factors described herein, including: an amount of memory, the quality of the at least one image, the compressibility of the at least one image, meta-data associated with the at least one image (e.g., time, location, subject, associated images), image content, a user's preferences, and other images.

In one embodiment, a camera may determine an amount of memory that should be vacated. For example, the camera may determine a total amount of memory to be vacated (e.g., 20 Mb). The camera may then determine how much to compress one or more images based on this total amount of memory. For example, the camera may determine how much each image should be compressed so that the total amount of memory vacated is 20 Mb. For example, image #8423 may be compressed by 100 kb, image #5892 may be compressed by 250 kb, etc.

In another embodiment, a camera may determine an amount of memory needed to store one or more images. For example, one or more manually-captured images stored in camera's image buffer may need to be transferred to the camera's secondary memory. The total amount of secondary memory needed to store these images may be 15 Mb. Based on this amount of memory (i.e., 15 Mb), the camera may then determine how much to compress each image stored in secondary memory. For example, image #4894 may be compressed by 15%, image #3187 may be compressed by 0%, etc.

In some embodiments, a camera may determine an anticipated amount of memory that may be needed. For example, the camera may anticipate (e.g., based on a user's image capturing habits, or an indication by a user) that the camera may need an additional 20 Mb of memory to capture more images. Based on this, the camera may determine how much to compress one or more images.

A camera may determine how much to compress one or more images based on the quality of the one or more images. For example, low quality images may be compressed more than high quality images. In one example, a rating of an image may be compared to a threshold value (e.g., a predetermined threshold value, a rating of another image). If the rating is greater than the threshold value, then the image may be compressed by a first amount (e.g., with a compression setting of 80%). If the rating is less than the threshold value, then the image may be compressed by a second amount (e.g., with a compression setting of 60%).

In another example, a camera may determine that a plurality of images should be compressed. Of this plurality of images, all images with ratings greater than a 5 may be compressed by a first amount (e.g., at least 100 kb) and all image with ratings less than 5 may be compressed by a second amount (e.g., at least 200 kb). In another example, an image may be compressed based on a mathematical function of its rating. For example, the camera may adjust the compression setting for a JPEG compression program to be: compression_setting=10+(9*image_rating). Thus, an image with a rating of 6.3 might be compressed with a compression setting of 67%.

In another example, an image may be compressed based on a categorical rating of the image. For instance, an image may be compressed with a compression setting equal to: compression_setting=30+70*(image_sharpness_rating). In another example, an image may be compressed based on a plurality of ratings of the image. For instance, an image may be compressed with a compression setting of 80% if the image received an exposure rating of better than 7 and a sharpness rating of better than 8. If the image's exposure rating is better than 7 but the image's sharpness rating is worse than 8, then the image may be compressed with a compression setting of 60%.

As mentioned above, a camera may determine how much to compress an image based on the compressibility of the at least one image. For example, images that are more compressible (i.e., images that can be compressed more with less loss of quality) may be compressed more than images that are less compressible (i.e., images that lose more quality when compressed). For example, the camera may compress a highly compressible image by 30%, where as a less compressible images may only be compressed by 15%.

In some embodiments, a camera may determine how much to compress an image based on meta-data associated with the image. Examples include:
   (i) The camera may determine how much to compress an image based on a rating of the image that is stored as meta-data associated with the image. For example, a rating of an automatically-captured image may be determined and stored with the image when the image is captured. See above for details about determining how much to compress an image based on a rating of the image.
   (ii) Meta-data associated with an image may indicate whether the image has been compressed before, and if so, how much the image was compressed. In one example, the camera may compress images based on how much they were previous compressed. For example, the camera may determine to never compress an image by more than 50%. If an image has already been compressed by 40%, then the camera may only compress this image by an additional 10% relative to the original size of the image.
   (iii) Information about the subject of an image (e.g., determined by the camera, or supplied by a user) may be stored as meta-data associated with the image. The camera may user this information to determine how much to compress an image. For example, images of Alice may be compressed 10% more than images of Bob.
   (iv) The camera may store information about how or when an image is captured as meta-data associated with the image. The camera may compress an images based on this information. For example, images that were automatically captured at approximately the same time that a user manually captured one or more images may be compressed less than images that were automatically captured at other times.

In some embodiments, a camera may determine how much to compress an image based on image content of the at least one image. Examples include:
(i) The camera may use an image analysis program to analyze one or more images stored in memory to determine how much each of these images should be compressed.
(ii) The camera may analyze the images stored in memory to determine which images are overexposed, which are underexposed, and which are correctly exposed. Overexposed or underexposed images may be compressed more than correctly exposed images.
(iii) The camera may use image recognition software to determine the subjects of one or more images stored in memory and then determine how much to compress the images based on the subjects of images. For example, the camera may compress images of landscapes by 40% and close-up images of people by 5%.
(iv) The camera may compress images so that it maintains at least one high quality image of each subject. For example, all of the images of Alice except for one may be compressed by 50%, and the other images Alice may be compressed by 0%.
(v) Images that were captured as a group may be compressed as a group. For example, the camera may automatically capture a 5-image burst set of images (e.g., images of a sporting event). In order to maintain consistency in the 5-image group, all of the images may be compressed by the same amount, even if one of the images is significantly higher or lower quality than the rest of the group.

In some embodiments, the camera may determine how much to compress an image based on user preferences. Examples include:
(i) A user may indicate that he prefers images of a certain type. Based on this preference, the camera may determine to compress certain images more than others. For example, a user may indicate that he is most interested in printing images of groups of people, but will mostly likely not print images of landscapes. Based on this, the camera may compress automatically-captured images of landscapes 30% more than automatically-captured images of people.
(ii) The camera may use an artificial intelligence program to determine a user's preferences (e.g., by tracking which images a user captures manually, which images the user chooses to delete, and which images the user sends directly to a printer). For example, the camera may determine that a user dislikes images that have busy or complicated backgrounds. Based on this, the camera may determine that images that have busy or complicated backgrounds should be compressed more than images with simple backgrounds.
(iii) A user may indicate that he plans on capturing 15 more images in addition to those that are already stored by the camera. In response to this indication, the camera may compress images stored in the camera's memory enough to make room for the 15 additional images that the user wants to capture.
(iv) The camera may prompt a user to indicate how much he would like to compress one or more images. For example, the camera may output a prompt to user "How much would you like to compress the automatically-captured images of Alice at the beach?" The user may then respond to this prompt (e.g., by using a dial on the camera to select the "high quality" compression setting. Based on this response, the camera may compress the images of Alice at the beach using a JPEG compression setting of 90%.

In some embodiments, the camera may determine how much to compress an image based on factors relating to one or more other images. Examples include:
(i) The camera may compare the ratings of four images and sort the images based on their ratings. The best image may be not be compressed at all, the second best image may be compressed with a compression setting of 80%, and the remaining two images may be compressed with a compression setting of 50%.
(ii) A group of images may be compressed based on the average quality of the images in the group. For example, a group of 5 images may have ratings of 9, 6, 5, 5, and 4. The camera may determine that the average rating of this group of images is 5.8 and then compress all of these images based on this 5.8 rating (i.e., the image that rated a 9 would be compressed using the same compression setting as the image that was rated a 4).

One way for the camera to determine an amount of compression is to use a mathematical formula or function. This mathematical formula may reference one or more variables (i.e., factors) and may include various mathematical operations (e.g. +, −, *, /, mean, standard deviation, logarithm, derivative, integral), functions (e.g., search_term_in_database( ), autocorrelation( ), dilate( ), fourier_transform( ), template_match( ), and constants (e.g., 10, 20 pixels, 300 milliseconds, 4 lumens, 0.02, 15%, pi, TRUE, yellow, "raining", 5200 K). Note that a wide variety of mathematical functions are know to those skilled in the art and need not be described in detail herein.

For example, images may be compressed according to the following formula: percentage_of_compression=(total_memory_to_free/total_original_size_of_images)*(1+(rating_of_image/10)−(avg_image_rating/10)). Note that according to the above formula, the camera may compress a plurality of images based on an amount of memory that should be freed and the quality of the images. Images with higher ratings will be compressed less than images with lower ratings, but all images will be compressed based on the amount of memory to be freed. Other formulas include
(i) compression_setting=70+3*(image_rating−average_image_rating)
(ii) compression_setting=50*(1−(memory_to_free/max_image_size))+5*image_rating In some embodiments, an image may be compressed based on a condition or stepwise function relating to a rating of the image. For example, the camera may compress an automatically-captured image stored in secondary memory according to the following rules:
(i) if (image_rating<2) then (compression_setting=30%)
(ii) if (2<=image_rating<5) then (compression_setting=50%)
(iii) if (5<=image_rating<8) then (compession_setting=80%)
(iv) if (8<image_rating) then (compression_setting=100%)

It is worthwhile to note that deletion may be viewed as an extreme form of compression. For example, compressing an image by 100% (i.e., compressing an image so that is 100% smaller than its original size) is more or less equivalent to deleting the image. Similarly, the amount of memory taken up by an image that is compressed to 1% of its original size may be insignificant in many cases. While the layperson typically differentiates between compression and deletion, one who is skilled in the art will recognize that determining an amount to compress an image may include determining whether to compress or delete the image.

Note that it is also possible that the camera may not determine how much to compress one or more images. For example, the camera may always compress images by the same amount. In a second example, the camera may not compress images at all, but rather may only delete images. Therefore, no step of determining how much to compress an image may be performed.

According to some embodiments, managing one or more automatically-captured images may comprise compressing or deleting at least one image from a memory or storage device. Various methods of compressing and deleting images are known to those skilled in the art and need not be described in detail herein.

In accordance with some embodiments, one or more images may be deleted or compressed automatically. For example, a user may not provide any indication that images should be compressed or deleted.

In accordance with some embodiments, a camera may provide one or more indications to a user relating to compressing or deleting one or more images. This indication may be output to a user using an output device (e.g., an LCD screen, an audio speaker). Some examples include:

(i) The camera may indicate to a user that one or more images have been compressed or deleted. For example, the camera may use an LCD screen to display a message to a user, "Automatically-captured images #123, 124, and 125 have been deleted."

(ii) The camera may indicate to a user that one or more images may be compressed or deleted. For example, the camera may use an LCD screen to display a message to a user, "I'm going to delete 3 automatically-captured images of Alice." In one embodiment, a user may confirm or otherwise respond to a prompt such as this one. See below for further details.

(iii) The camera may indicate to a user that one or more images are currently being compressed or deleted. For example, the camera may output an audio message, "Deleting low-quality images that were captured automatically." In a second example, the camera may beep each time it deletes an automatically-captured image.

(iv) The camera may indicate how one or more images have been compressed or deleted. For example, the camera may output an audio message to a user indicating, "An automatically-captured image of Alice on the beach has been compressed using a compression setting of 75%."

(v) The camera may indicate why one or more images have been compressed or deleted. For example, the camera may use an LCD screen to display a message to a user, "Automatically-captured images #123, 124, and 125 have been compressed to make room for additional manually-captured images. These images were selected for compression because they all have ratings worse than 4.0."

In some embodiments, the camera may prompt a user to confirm that one or more images should be compressed or deleted or provide other information relating to compressing or deleting images. Examples include:

(i) The camera may prompt a user to indicate whether a memory management function should be performed (i.e., whether one or more images should be compressed or deleted). For example, the camera may output a message to a user, "You only have 1 Mb of memory left. Would you like the camera to compress automatically-captured images to free up more memory?"

(ii) The camera may prompt a user to indicate whether one or more images should be compressed or deleted. For example, the camera may output a prompt to a user, "Images #2341, 2342, and 2345 have been selected to be deleted. Do you want to delete these images?" Note that it may be particularly appropriate to prompt a user before compressing or deleting one or more manually-captured images.

(iii) The camera may prompt a user to indicate which images should be compressed or deleted. For example, the camera may display a set of image thumbnails to the user and ask the user to select which images should be deleted from memory.

(iv) The camera may prompt a user to indicate how much one or more images should be compressed. For example, the camera may display an image to a user and prompt the user to indicate how much the image should be compressed.

Alternatively, a camera may not provide any indication relating to the compression or deletion of an image. As mentioned earlier, this may be acceptable to a user because the images that may be compressed or deleted may be automatically-captured images. Since the user never captured these images in the first place, he may be unconcerned about the camera deleting these images automatically. In addition, note that prompting a user to provide information relating to compressing or deleting one or more images (e.g., whether an image should be compressed/deleted, how much to compress and image) may be bothersome or annoying to the user.

Figure 16:
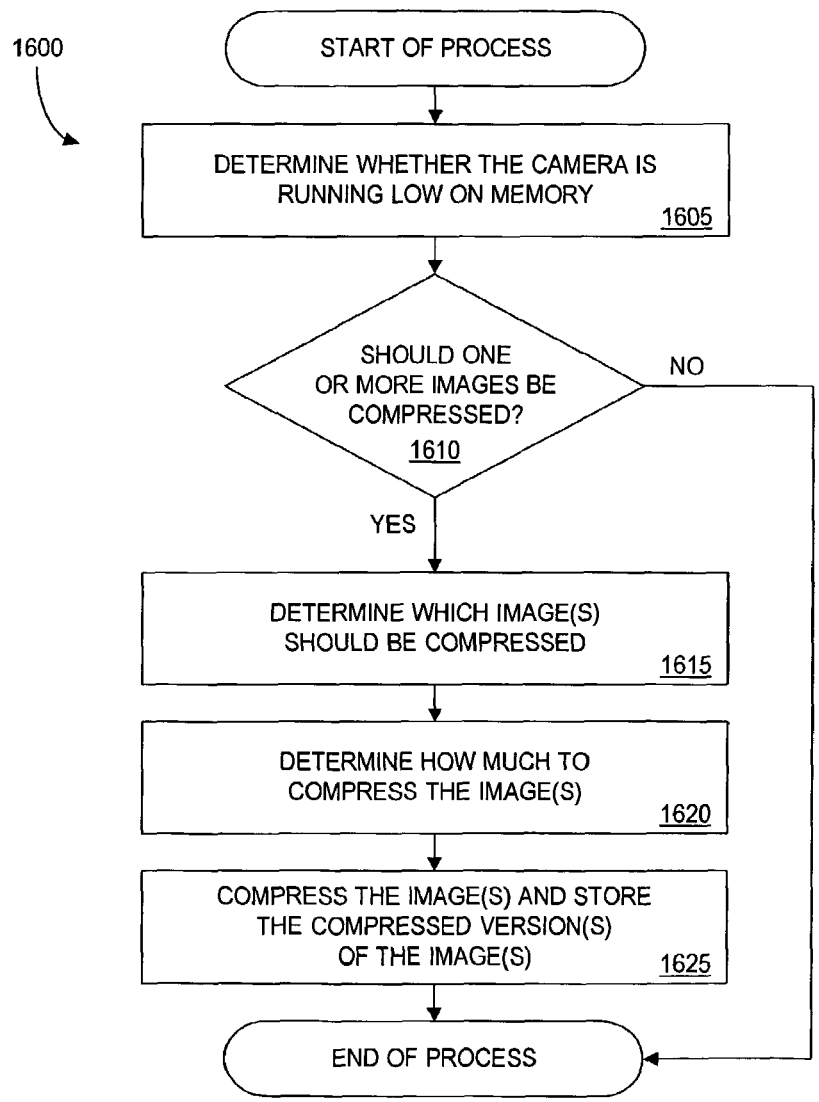
FIG. 16 is a flowchart illustrating a process consistent with at least one embodiment of the present invention.

Referring now to FIG. 16, a flowchart illustrates a process 1600 that is consistent with one or more embodiments of the present invention. The process 1500 is a method for managing images automatically. For illustrative purposes only, the process 1600 is described as being performed by a camera (e.g., camera 210).

In step 1605, a camera determines whether the camera is running low on memory. In step 1610, the camera determines whether one or more images should be compressed. If not the process ends. Otherwise, in step 1615, the camera determines which one or more images should be compressed. In step 1620, the camera determines how much to compress each of the selected images. In step 1625, the camera compresses the image(s) and stores the compressed versions of the images.

5. Alternative Embodiments

According to some embodiments of the present invention, alternatively, or in addition to automatically compressing or deleting an image, the camera may automatically transfer an image to a second device. For example, the camera may include a wireless communication port that allows the camera to transmit images to a second electronic device (e.g., a computer server, personal computer, portable hard drive, digital picture frame, or other electronic device). The second electronic device may then store copies of the images. After transferring the images to this second electronic device, the camera may delete the images, since the images are now stored securely on the second electronic device.

In one example, a camera may include a cellular telephone or be connected to a cellular telephone with wireless modem capabilities (e.g., a cellular telephone on a 2.5G or 3G wireless network). Using the cellular telephone, the camera may transmit one or more images to a computer server, which may store the images. In another example, a camera may communicate with a portable hard drive such as an Apple iPod (e.g., using a Firewire cable or a Bluetooth communication link). To free up memory on the camera, the camera may transfer images to the portable hard drive. In yet another example, a camera may have an Internet connection (e.g., using the 802.11 wireless protocol) and use this connection to transmit images to a personal computer that is connection to the Internet.

In accordance with some embodiments, transferring an image from the camera to a second electronic device, a camera may effectively expand its available memory. That is, some or all of the memory on the second electronic device may be available to the camera for storing images. In some embodiments, a camera may determine whether to transmit one or more images to a second electronic device. For example, the camera may determine whether it is running low on memory and therefore should free up some memory by transmitting one or more images to a second electronic device and then deleting them. This process may be performed based on a variety of factors, including, without limitation: an amount of memory (e.g., an amount of memory on the camera that is free, an amount of memory on the second electronic device that is free), an amount of bandwidth (e.g., an amount of bandwidth available for transmitting images to the second electronic device), factors relating to capturing images, a user's preferences, and factors relating to images stored in memory.

In some embodiments, Similarly, a camera may determine which images to transmit to a second electronic device. For example, the camera may free up some memory by transmitting images of Alice to a second electronic device, but keep all images of Bob stored in the camera's secondary memory for viewing using the camera. Note that the camera may determine which images to transmit based on a variety of factors, including: the quality of at least one image (e.g., as measured by a rating), the compressibility of at least one image, image content (e.g., the subject of an image), a user's preferences, meta-data associated with at least one image (e.g., time, location, subject, associated images), an amount of memory (e.g., an amount of memory on the camera that is free, an amount of memory on the second electronic device that is free), and an amount of bandwidth (e.g., an amount of bandwidth available for transmitting images to the second electronic device).

Since the bandwidth of a connection between the camera and a second electronic device may be limited, the camera may compress one or more images when transmitting them to a second electronic device. In addition, the camera may determine whether to compress an image when transmitting it to a second electronic device. For example, low quality images may be compressed before being transmitted to a second electronic device, whereas high quality images may be transmitted at full resolution to the second electronic device. Various ways of making such a determination are discussed herein. Similarly, the camera may determine how much to compress one or more images when transmitting the one or more images to a second electronic device, as discussed herein. This determination may be made based on a variety of different factors, including: an amount of memory (e.g., an amount of memory on the camera that is free, an amount of memory on the second electronic device that is free), and an amount of bandwidth (e.g., an amount of bandwidth available for transmitting images to the second electronic device).

In some embodiments, a camera may delete or compress an image after transmitting it to a second electronic device, thereby saving memory. Since a copy of the image may be stored on the second electronic device, there may be no danger of losing or degrading the image by deleting or compressing it on the camera. Of course, a camera need not delete or compress an image after transmitting the image to a second electronic device. For example, the camera may transmit an image to a second electronic device in order to create a backup copy of the image. It may be helpful to store duplicate copies of an image on the camera and on the second electronic device in a variety of circumstances. For instance, a user of the camera may be concerned about breaking or losing the camera. By storing a second copy of an image on a second electronic device, the user has some assurance that his image will not be lost completely if the camera is misplaced or broken. In another example, an image may be transmitted to a second electronic device but not stored on the second electronic device. For example a user may transmit a copy of an image to his friend's PDA or cell phone so that the friend can view the image.

In one alternate embodiment, a camera may only capture images automatically and may not capture images manually. For example, the camera may not have a shutter button or other shutter control. Instead, the camera may only capture images automatically, e.g., at times when the camera determines are appropriate for capturing images. To use the camera, a user may simply aim the camera at scenes that he thinks are interesting. The camera may adjust its settings and capture images in an appropriate, fully automatic manner.

To allow the user to indicate his preferences relating to automatically-captured images, in some embodiments a camera may have a control that allows a user to indicate a rating of one or more images or scenes. For example, the camera may have a rating dial or other input that a user may adjust to indicate a rating of a current image or scene. For example, a user may set the ratings dial to "8—very interesting" when a clown arrives at a child's birthday party, whereas it may be more appropriate to set the ratings dial to "3—less interesting" when children are leaving to go home after the birthday party. It is hoped that by providing a ratings dial or other simple control to a user, the user will be able to focus his attention on which moments and scenes he wants to capture rather than the technical aspects of composing good photographs.

While the majority of the examples in this disclosure have described a user operating the camera (e.g., holding the camera in his hands), it should be noted that the camera may not by held or operated by a user. For example, a camera may by mounted to a wall, telephone pole, or other stable platform in a public place and automatically capture images of this public place. For instance, a camera at an amusement park may automatically capture images of children with their favorite cartoon character mascots. In another example, a camera may be mounted on an autonomous or radio-controlled robot. For example, the camera may be mounted on a miniature blimp that may fly around the inside of a basketball stadium. The camera/blimp may automatically capture images of a basketball game, or people in the stands watching the basketball game. In another example, a camera may be carried by a user, but not in the user's hands. For example, the camera may be mounted on a baseball cap that is worn by a user, leaving the user's hands free for other activities. As the user proceeds through the activities of his day (e.g., sightseeing with his family), the camera may automatically capture and manage images.

According to some embodiments, images captured by the camera may be rated and then displayed based on these ratings. For example, images that were captured automatically may be displayed in order of their ratings (e.g., highest rated images first). In a second example, only highly-rated images may be displayed to a user. A general process may include one or more of the steps of: determining an image, determining a rating for the image, and displaying the image to a user based on the rating for the image. An alternate general process may include the steps of determining a plurality of images, determining a rating for each of the plurality of images, and displaying at least one of the plurality of images to a user based on at least one of the ratings. In some embodiments, a camera or other device including a display may only display those images that have ratings higher than a threshold value, may determine an order to display the plurality of images based on at least one of the ratings, and/or may display the plurality of images based on at least one of the ratings. In some embodiments, the rating may be based on the quality of the image, the desirability of the image, the exposure of the image, and/or a comparison of the image to at least one second image. In some embodiments, at least one of the plurality of images may be captured automatically.

Although the methods and apparatus of the present invention have been described herein in terms of particular embodiments, those skilled in the art will recognize that various embodiments of the present invention may be practiced with modification and alteration without departing from the teachings disclosed herein.

What is claimed is:

1. An integrated device comprising:
   an image sensor;
   a cellular telephone;
   a touch screen;
   a wireless transmitter;
   a Global Positioning System (GPS) receiver;
   a Universal Serial Bus (USB) port;
   a microphone;
   non-volatile memory; and
   a processor in communication with the image sensor, cellular telephone, wireless transmitter, GPS receiver, USB port, microphone and non-volatile memory, the processor being configured to:
      cause the image sensor to acquire a first image;
      cause storage of the first image in the non-volatile memory;
      determine at least one characteristic of the first image;
      apply at least one acquisition factor for causing the processor to instruct the image sensor to acquire a second image based on the at least one characteristic of the first image, the at least one characteristic of the first image including whether the first image is blurred;
      receive a location remote from the integrated device; and
      receive instruction to cause automatic transmission of at least one of the first image and second image to the location via the wireless transmitter.

2. The integrated device of claim 1, wherein the location is a mobile wireless device.

3. The integrated device of claim 2, wherein the transmitted image is tagged to cause display by the mobile wireless device and not storage at the mobile wireless device after being displayed.

4. The integrated device of claim 1, wherein the instruction includes at least one selection factor for selecting the at least one of the first image and second image for automatic transmission to the location.

5. The integrated device of claim 4, wherein the at least one selection factor for selecting the at least one of the first image and second image for automatic transmission to the location is an identified person in the at least one of the first image and second image.

6. The integrated device of claim 4, wherein the processor is further configured to tag the at least one of the first image and second image with a geographical location corresponding to where the at least one of the first image and second image was captured, the geographical location being determined based at least in part on signals received by the GPS receiver; and
   the at least one selection factor for selecting at least one of the first image and second image for automatic transmission to the location being a user selected geographical location.

7. The integrated device of claim 1, wherein the processor is further configured to receive the at least one acquisition factor for causing the processor to instruct the image sensor to acquire the second image.

8. The integrated device of claim 7, wherein the at least one acquisition factor for causing the processor to instruct the image sensor to acquire the second image further includes a minimum noise level, the noise level being sensed by the microphone.

9. The integrated device of claim 7, wherein the at least one characteristic of the first image further includes an exposure level of the first image.

10. The integrated device of claim 9, wherein the at least one characteristic of the first image further includes whether at least one person captured in the first image blinked.

11. A method for an integrated device for automatically transmitting an image, the integrated device including an image sensor, a cellular telephone, a touch screen, a wireless transmitter, a Global Positioning System (GPS) receiver, a Universal Serial Bus (USB) port, a microphone, non-volatile memory and a processor in communication with the image sensor, cellular telephone, wireless transmitter, GPS receiver, USB port, microphone and non-volatile memory, the method comprising:
   causing the image sensor to acquire a first image;
   storing the first image in the non-volatile memory;
   determining, by the processor, at least one characteristic of the first image;
   applying at least one acquisition factor for causing the processor to instruct the image sensor to acquire a second image based on the at least one characteristic of the first image, the at least one characteristic of the first image including whether the first image is blurred;
   receiving a location remote from the integrated device; and
   receiving instruction to cause automatic transmission of at least one of the first image and second image to the location via the wireless transmitter.

12. The method of claim 11, wherein the location is a mobile wireless device.

13. The method of claim 12, wherein the transmitted image is tagged to cause display by the mobile wireless device and not storage at the mobile wireless device after being displayed.

14. The method of claim 11, wherein the instruction includes at least one selection factor for selecting the at least one of the first image and second image for automatic transmission to the location.

15. The method of claim 14, wherein the at least one selection factor for selecting the at least one of the first image and second image for automatic transmission to the location is an identified person in the at least one of the first image and second image.

16. The method of claim 14, further comprising tagging the at least one of the first image and second image with a geographical location corresponding to where the at least one of the first image and second image was captured, the geographical location being determined based at least in part on signals received by the GPS receiver; and the at least one selection factor for selecting at least one of the first image and second image for automatic transmission to the location being a user selected geographical location.

17. The method of claim 11, further comprising receiving the at least one acquisition factor for causing the processor to instruct the image sensor to acquire the second image.

18. The method of claim 17, wherein the at least one acquisition factor for causing the processor to instruct the image sensor to acquire the second image further includes a minimum noise level, the noise level being sensed by the microphone.

19. The method of claim 17, wherein the at least one characteristic of the first image further includes an exposure level of the first image.

20. The method of claim 19, wherein the at least one characteristic of the first image further includes whether at least one person captured in the first image blinked.

* * * * *